United States Patent
Yamashita

(10) Patent No.: US 7,809,181 B2
(45) Date of Patent: Oct. 5, 2010

(54) PATTERN INSPECTION APPARATUS, IMAGE ALIGNMENT METHOD, DISPLACEMENT AMOUNT ESTIMATION METHOD, AND COMPUTER-READABLE RECORDING MEDIUM WITH PROGRAM RECORDED THEREON

(75) Inventor: Kyoji Yamashita, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 818 days.

(21) Appl. No.: 11/692,352

(22) Filed: Mar. 28, 2007

(65) Prior Publication Data

US 2008/0037860 A1   Feb. 14, 2008

(30) Foreign Application Priority Data

Aug. 10, 2006   (JP) .............................. 2006-217672

(51) Int. Cl.
G06K 9/00   (2006.01)
G06K 9/62   (2006.01)
G06K 9/32   (2006.01)

(52) U.S. Cl. ....................... 382/151; 382/141; 382/144; 382/145; 382/209; 382/294

(58) Field of Classification Search ................. 382/141, 382/144, 145, 151, 209, 217, 218, 294
See application file for complete search history.

(56) References Cited

U.S. PATENT DOCUMENTS 4,805,123 A * 2/1989 Specht et al. ................ 382/144
5,563,702 A 10/1996 Emery et al.
5,742,067 A * 4/1998 Imai ............................ 250/548
6,396,943 B2 * 5/2002 Yamashita ................... 382/144

(Continued)

FOREIGN PATENT DOCUMENTS

JP   63-88682   4/1988

(Continued)

OTHER PUBLICATIONS

M. Takagi, et al., Handbook on Image Analysis, University of Tokyo Press, Jan. 17, 1991., 2 pages (with Partial English Translation).

(Continued)

*Primary Examiner*—Bhavesh M Mehta
*Assistant Examiner*—Utpal Shah
(74) *Attorney, Agent, or Firm*—Oblon, Spivak, McClelland, Maier & Neustadt, L.L.P.

(57) ABSTRACT

A pattern inspection apparatus includes a first unit configured to acquire an optical image of pattern, a second unit configured to generate a reference image to be compared, a third unit configured to calculate elements of a normal matrix for a least-squares method for calculating a displacement amount displaced from a preliminary alignment position, a forth unit configured to estimate a type of the reference image pattern, by using some of the elements of the normal matrix, a fifth unit configured to calculate the displacement amount based on the least-squares method, by using a normal matrix obtained by deleting predetermined elements depending upon the type of the pattern, a sixth unit configured to correct an alignment position between the optical image and the reference image to a position displaced by the displacement amount, and a seventh unit configured to compare the optical image and the reference image.

19 Claims, 14 Drawing Sheets

U.S. PATENT DOCUMENTS

| | | | |
|---|---|---|---|
| 6,481,003 B1 * | 11/2002 | Maeda | 430/22 |
| 6,876,946 B2 * | 4/2005 | Yasuda et al. | 702/152 |
| 7,330,606 B2 * | 2/2008 | Yakhini et al. | 382/294 |
| 7,508,515 B2 * | 3/2009 | Hanina et al. | 356/401 |
| 2007/0053582 A1 | 3/2007 | Yamashita | |

FOREIGN PATENT DOCUMENTS

| | | |
|---|---|---|
| JP | 3-278057 | 12/1991 |
| JP | 5-281154 | 10/1993 |
| JP | 6-307826 | 11/1994 |
| JP | 8-64511 | 3/1996 |
| JP | 8-76359 | 3/1996 |
| JP | 8-77357 | 3/1996 |
| JP | 8-304997 | 11/1996 |
| JP | 10-96613 | 4/1998 |
| JP | 10-318950 | 12/1998 |
| JP | 11-132959 | 5/1999 |
| JP | 11-153550 | 6/1999 |
| JP | 2000-348177 | 12/2000 |
| JP | 2001-141677 | 5/2001 |
| JP | 2002-14062 | 1/2002 |
| JP | 2004-317427 | 11/2004 |

OTHER PUBLICATIONS

U.S. Appl. No. 11/678,748, filed Feb. 26, 2007, Yamashita.
U.S. Appl. No. 11/692,352, filed Mar. 28, 2007, Yamashita.
M. Takagi, et al., "Handbook on Image Analysis"; University of Tokyo Press; Jan. 17, 1991; pp. 442-443 (with Partial English Translation).

* cited by examiner

FIG. 5A   Trace < $\theta_1$
Absolute Value Of Determinant Of 2×2 Matrix < $\theta_2$
⇒ No structure (Zero-Dimension, Rank Number=1)

FIG. 5B   Trace ≧ $\theta_1$
Absolute Value Of Determinant Of 2×2 Matrix < $\theta_2$
⇒ Line & Space Pattern (One-Dimension, Rank Number=2)

FIG. 5C   Trace ≧ $\theta_1$
Absolute Value Of Determinant Of 2×2 Matrix ≧ $\theta_2$
⇒ Otherwise (Two-Dimension, Rank Number=3)

FIG. 8A $\sum(\frac{\partial U}{\partial x})^2 < \sum(\frac{\partial U}{\partial y})^2$

⇩

Omit $\left(\frac{\partial U}{\partial x}\right)$

FIG. 8B $\sum(\frac{\partial U}{\partial x})^2 > \sum(\frac{\partial U}{\partial y})^2$

⇩

Omit $\left(\frac{\partial U}{\partial y}\right)$

PATTERN INSPECTION APPARATUS, IMAGE ALIGNMENT METHOD, DISPLACEMENT AMOUNT ESTIMATION METHOD, AND COMPUTER-READABLE RECORDING MEDIUM WITH PROGRAM RECORDED THEREON

CROSS-REFERENCE TO RELATED APPLICATION

This application is based upon and claims the benefit of priority from the prior Japanese Patent Application No. 2006-217672 filed on Aug. 10, 2006 in Japan, the entire contents of which are incorporated herein by reference.

BACKGROUND OF THE INVENTION

1. Field of the Invention

The present invention relates to pattern inspection apparatus, an image alignment method, a displacement estimation method or a computer program to apply the method. For example, it is related with a technique for pattern inspection which inspects a pattern defect of a template used in manufacturing semiconductor devices, and an apparatus which inspects a defect of a micro-pattern of a photomask, a wafer, or a liquid crystal substrate used in manufacturing a semiconductor device or a liquid crystal display (LCD).

2. Description of Related Art

In recent years, with increasing integration of large volume of large-scale integrated (LSI) circuits, circuit line-widths required for semiconductor devices are becoming narrower and narrower. These semiconductor devices are manufactured by transferring a photo-mask pattern onto a wafer by means of a reduced-magnification-projection exposure apparatus (a stepper) while using a template pattern (called a mask or a reticle, and will be called a mask hereinafter) on which circuit patterns are written. Therefore, a pattern writing apparatus which can write micro-circuits onto a mask is deployed in writing a mask for transferring micro-circuit patterns onto a wafer. A pattern circuit may be directly written onto a wafer by using the pattern direct-writing apparatus. In addition to a writing apparatus using electron beams, a laser beam pattern writing apparatus which uses laser beams to write a pattern is also developed.

Improvement in yield is crucial in manufacturing an LSI which requires a lot of cost. However, as one-gigabit DRAM (Random Access Memory), the precision of a pattern has been changing from sub-microns to nanometers. One of major factors which decrease the yield is pattern defects of a mask pattern used in exposing and transferring a micro-pattern onto a semiconductor wafer by a photolithography technique. In recent years, with miniaturization of an LSI pattern written on a semiconductor wafer, dimensions which have to be detected as a pattern defect are becoming extremely small. Therefore, a pattern inspection apparatus which inspects defects of a transfer mask used in manufacturing an LSI needs to be highly precise.

On the other hand, with development of multimedia, the size of a liquid crystal substrate of an LCD (Liquid Crystal Display) is becoming large: 500 mm×600 mm or more, and miniaturization of a pattern of a thin film transistor (TFT) or the like formed on a liquid crystal substrate is advancing. Therefore, it is required that a considerably small pattern defect should be inspected in a large area. For this reason, development of pattern inspection apparatus which efficiently inspects a defect of a pattern of a large-area LCD and a photomask used in manufacturing the large-area LCD in a short time is urgently required.

As to a conventional pattern inspection apparatus, it is well-known that an inspection is performed by comparing an optical image captured by photographing a pattern written on pattern, such as a lithography mask, at a predetermined magnification by using a magnifying optical system with design data or an optical image captured by photographing the same pattern on the target workpiece (see, e.g., Published Unexamined Japanese Patent Application No. 08-76359 (JP-A-08-76359)).

For example, the following is known as pattern inspection methods: die-to-die inspection which compares optical image data obtained by capturing the same patterns at different positions on the same mask, and die to database inspection which inputs drawing data (design pattern data) obtained by converting CAD data into appropriate format to be inputted by a drawing apparatus when drawing a pattern on a mask, into an inspection apparatus, generates design image data (reference image) based on the inputted drawing data, and compares the generated design image data with an optical image serving as measurement data obtained by capturing an image of the pattern. In these inspecting methods of the inspection apparatus, pattern is placed on a stage to be scanned by a flux of light when the stage moves to perform inspection. The target workpiece is irradiated with flux of light from a light source and an illumination optical system. Light transmitted through the target workpiece or reflected by the target workpiece is focused onto a sensor through an optical system. The image captured by the sensor is transmitted to a comparing circuit as measurement data. In the comparing circuit, after alignment of the images, the measurement data is compared with reference data based on appropriate algorithm. When the measurement data is different from the reference data, it is estimated there to be a pattern defect.

Herein, the reference image and the optical image are compared in each area of a predetermined size. Highly precise alignment between the reference image and the optical image is required for performing this comparison. A technique for calculating displacement amount or "deviation" between a reference image and an optical image by use of a least-squares method is disclosed in a reference (for example, refer to JP-A-11-153550). Further, an interpolation method for interpolating image data to be obtained by use of neighboring 4-point or 16-point image data is described in a reference (for example, refer to Image Analysis Handbook, pp. 442 to 443, University of Tokyo Press, first edition issued on Jan. 17, 1991).

With a miniaturization of a pattern, there is a demand for a further precision of alignment required for detecting microdefects. The point herein is to correct only systematic error factors such as a stage placement error, a speed error or a magnification error, but not to correct inconsistent portions that occur locally and randomly such as defects, if possible.

As described above, highly precise alignment between a reference image and an optical image is required for performing comparison. However, with a miniaturization of a pattern, it has become difficult to detect relative displacement between the reference image and the optical image in high precision.

BRIEF SUMMARY OF THE INVENTION

It is an object of the present invention to provide a method and an apparatus which perform highly precise positional alignment between a reference image and an optical image.

In accordance with one aspect of the present invention, a pattern inspection apparatus includes an optical image acquiring unit configured to acquire an optical image of pattern to be inspected on which a pattern is formed, a reference image generating unit configured to generate a reference image to be compared with the optical image, a normalal matrix element calculating unit configured to calculate a plurality of elements of a normalal matrix for a least-squares method for calculating a displacement amount displaced from a preliminary alignment position between the optical image and the reference image, a pattern type estimating unit configured to estimate a type of a pattern indicated by the reference image, by using some of the plurality of elements of the normalal matrix, a displacement calculating unit configured to calculate the displacement amount displaced from the preliminary alignment position based on the least-squares method, by using a normalal matrix obtained by deleting predetermined elements from the plurality of elements of the normalal matrix depending upon the type of the pattern which has been estimated, a position correcting unit configured to correct an alignment position between the optical image and the reference image to a position displaced from the preliminary alignment position by the displacement amount, and a comparing unit configured to compare the optical image and the reference image whose alignment position has been corrected.

In accordance with another aspect of the present invention, a pattern inspection apparatus includes an optical image acquiring unit configured to acquire an optical image of pattern to be inspected on which a pattern is formed, a reference image generating unit configured to generate a reference image to be compared with the optical image, a first SSD (Sum of Squared Difference) calculating unit configured to calculate a first displacement amount from a preliminary alignment position between the optical image and the reference image to a first position where an SSD between a pixel value of the optical image and a pixel value of the reference image is minimized, a normal matrix element calculating unit configured to calculate a plurality of elements of a normal matrix for a least-squares method for calculating a displacement amount displaced from the preliminary alignment position, a pattern type estimating unit configured to estimate a type of a pattern indicated by the reference image, by using some of the plurality of elements of the normal matrix, a displacement calculating unit configured to calculate a second displacement amount displaced from the preliminary alignment position based on the least-squares method, by using a normal matrix obtained by deleting predetermined elements from the plurality of elements of the normal matrix depending upon the type of the pattern which has been estimated, a second SSD calculating unit configured to calculate an SSD between the pixel value of the optical image and the pixel value of the reference image at a second position displaced from the preliminary alignment position by the second displacement amount, an SSD estimating unit configured to estimate which of the SSD at the first position and the SSD at the second position is smaller, a position correcting unit configured to correct an alignment position between the optical image and the reference image to a position where a smaller SSD as a result estimated by the SSD estimating unit is obtained, and a comparing unit configured to compare the optical image and the reference image whose alignment position has been corrected.

In accordance with another aspect of the present invention, a pattern inspection apparatus includes an optical image acquiring unit configured to acquire an optical image of pattern to be inspected on which a pattern is formed, a reference image generating unit configured to generate a reference image to be compared with the optical image, a first SSD (Sum of Squared Difference) calculating unit configured to calculate a first displacement amount from a preliminary alignment position between the optical image and the reference image to a first position where an SSD between a pixel value of the optical image and a pixel value of the reference image is minimized, a normal matrix element calculating unit configured to calculate a plurality of elements of a normal matrix for a least-squares method for calculating a displacement amount displaced from the first position, a pattern type estimating unit configured to estimate a type of a pattern indicated by the reference image, by using some of the plurality of elements of the normal matrix, a displacement calculating unit configured to calculate a second displacement amount displaced from the first position based on the least-squares method, by using a normal matrix obtained by deleting predetermined elements from the plurality of elements of the normal matrix depending upon the type of the pattern which has been estimated, a second SSD calculating unit configured to calculate an SSD between the pixel value of the optical image and the pixel value of the reference image at a second position displaced from the first position by the second displacement amount, an SSD estimating unit configured to estimate which of the SSD at the first position and the SSD at the second position is smaller, a position correcting unit configured to correct an alignment position between the optical image and the reference image to a position where a smaller SSD as a result estimated by the SSD estimating unit is obtained, and a comparing unit configured to compare the optical image and the reference image whose alignment position has been corrected.

In accordance with another aspect of the present invention, an image alignment method for aligning an optical image and a reference image for use in a comparing inspection of pattern to be inspected on which a pattern is formed, the method includes calculating a first displacement amount from a preliminary alignment position between the optical image and the reference image to a first position where an SSD (Sum of Squared Difference) between a pixel value of the optical image and a pixel value of the reference image is minimized, calculating a plurality of elements of a normal matrix for a least-squares method for calculating a displacement amount displaced from the first position, estimating a type of a pattern indicated by the reference image, by using some of the plurality of elements of the normal matrix, calculating a second displacement amount displaced from the first position based on the least-squares method, by using a normal matrix obtained by deleting predetermined elements from the plurality of elements of the normal matrix depending upon the type of the pattern which has been estimated, calculating an SSD between the pixel value of the optical image and the pixel value of the reference image at a second position displaced from the first position by the second displacement amount, estimating which of the SSD at the first position and the SSD at the second position is smaller, and correcting an alignment position between the optical image and the reference image to a position where a smaller SSD as a result of the estimating of SSD is obtained, to output a result of the correcting.

In accordance with another aspect of the present invention, a displacement amount estimation method for estimating a displacement amount between an optical image and a reference image for use in a comparing inspection of pattern to be inspected on which a pattern is formed, by using a least-squares method, the displacement amount estimation method includes calculating a plurality of elements of a normal matrix for a least-squares method, based on a preliminary alignment position between the optical image and the reference image, estimating a type of a pattern indicated by the reference image, by using some of the plurality of elements of the normal matrix, and calculating the displacement amount displaced from the preliminary alignment position based on the least-squares method, by using a normal matrix obtained by deleting predetermined elements from the plurality of elements of the normal matrix depending upon the type of the pattern which has been estimated, to output the displacement amount calculated.

In accordance with another aspect of the present invention, a computer-readable recording medium with a program recorded causes a computer to deploy the processes of storing an optical image and a reference image for use in a comparing inspection of pattern to be inspected on which a pattern is formed, in a storage device, reading the optical image and the reference image from the storage device, and calculating a plurality of elements of a normal matrix for a least-squares method, based on a preliminary alignment position between the optical image and the reference image, estimating a type of a pattern indicated by the reference image, by using some of the plurality of elements of the normal matrix, and calculating a displacement amount displaced from the preliminary alignment position based on the least-squares method, by using a normal matrix obtained by deleting predetermined elements from the plurality of elements of the normal matrix depending upon the type of the pattern which has been estimated, to output the displacement amount calculated.

BRIEF DESCRIPTION OF THE DRAWINGS

FIGS. 5A, 5B, and 5C are shown for explaining dimension judging described in Embodiment 1;

FIGS. 8A and 8B are shown for explaining a method of deleting an element of the line & space pattern with an arbitrary angle described in Embodiment 1;

DETAILED DESCRIPTION OF THE INVENTION

Embodiment 1

Figure 1:
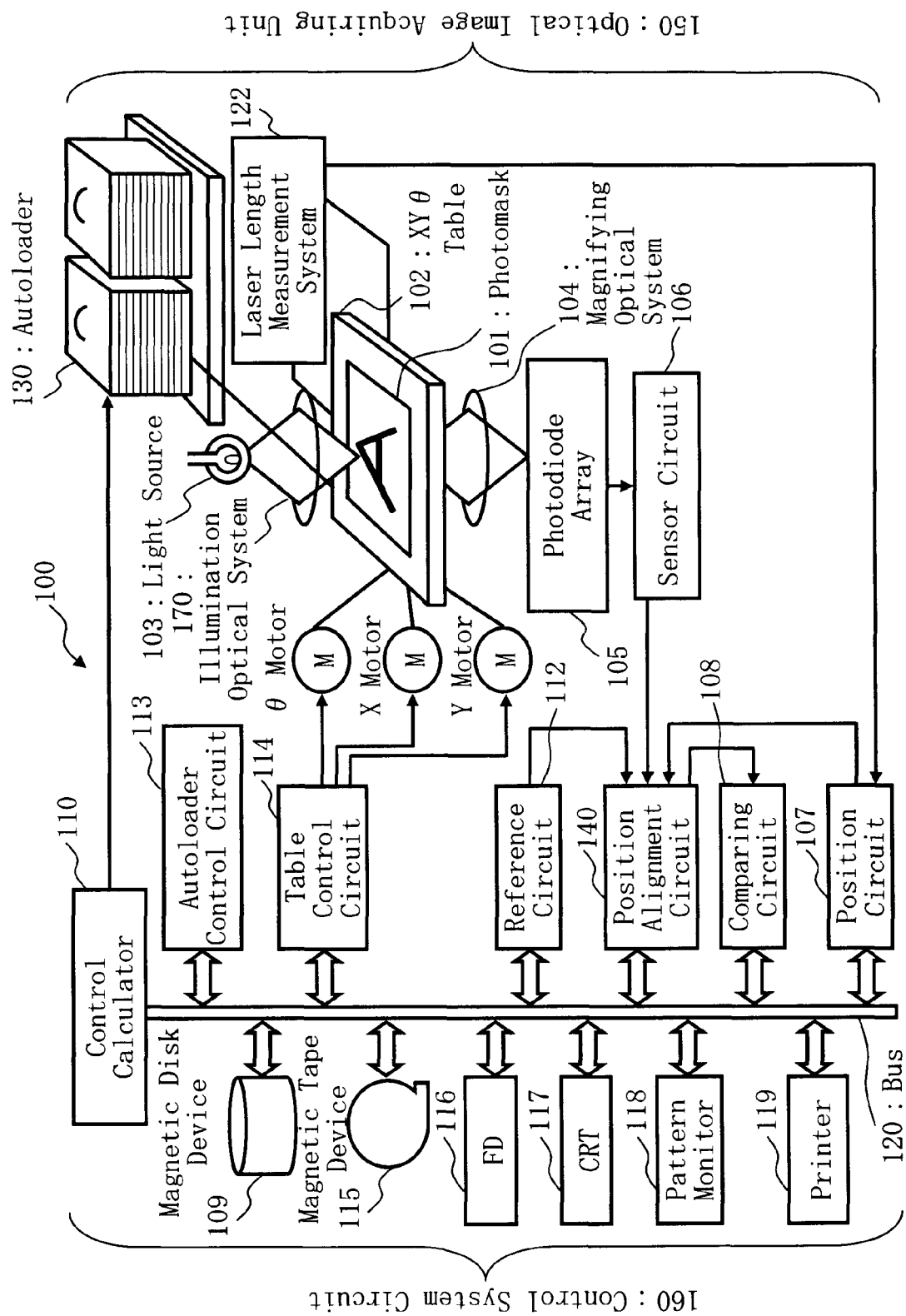
FIG. 1 is a schematic diagram showing the structure of pattern inspection apparatus described in Embodiment 1.

FIG. 1 is a schematic diagram showing the configuration of pattern inspection apparatus described in Embodiment 1. In the figure, pattern inspection apparatus 100 that inspects a defect of a substrate, such as a mask or a wafer on which a pattern is formed, serving as pattern includes an optical image acquiring unit 150 and a control system circuit 160. The optical image acquiring unit 150 includes an XYθ table 102, a light source 103, a magnifying optical system 104, a photodiode array 105, a sensor circuit 106, a laser length measurement system 122, an autoloader 130, and an illumination optical system 170. In the control system circuit 160, a control calculator 110 serving as a computer is connected, through a bus 120 serving as a data transmission path, to a position circuit 107, a comparing circuit 108, a reference circuit 112 being an example of a reference image generating unit, an alignment circuit 140, an autoloader control circuit 113, a table control circuit 114, a magnetic disk device 109, a magnetic tape device 115, a flexible disk device (FD) 116, a CRT 117, a pattern monitor 118, and a printer 119. The XYθ table 102 is driven by an X-axis motor, a Y-axis motor, and a θ-axis motor. In FIG. 1, only elements necessary for explaining Embodiment 1 are described, and others are not described. It should be understood that other constituent elements generally necessary for the target workpiece inspection apparatus 100 are included.

Figure 2:
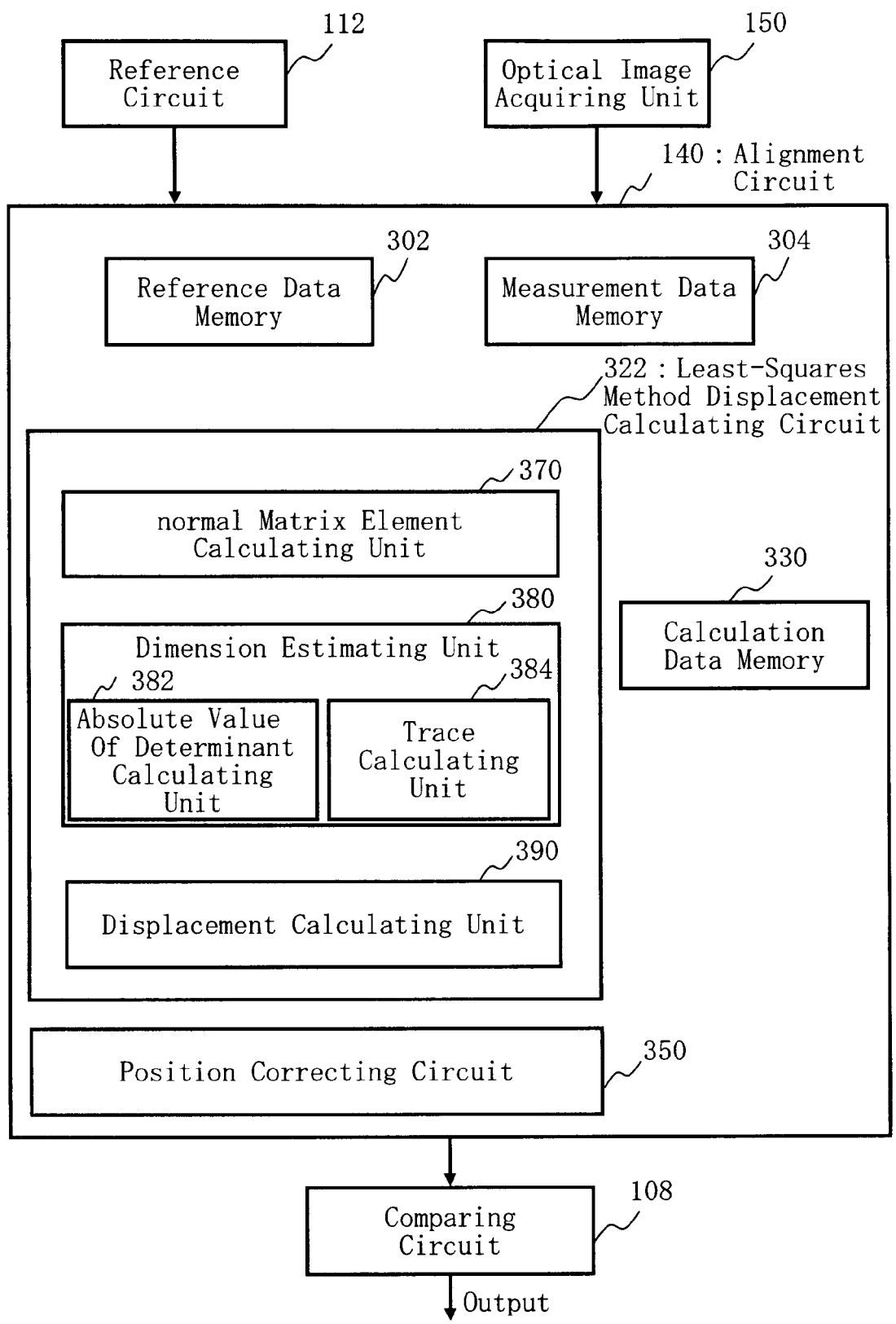
FIG. 2 is a block diagram showing the structure of an alignment circuit described in Embodiment 1.

FIG. 2 is a block diagram showing an example of the configuration of the alignment circuit in Embodiment 1. In the figure, the alignment circuit 140 includes a reference data memory 302, a measurement data memory 304, a least-squares method displacement calculating circuit 322, a calculation data memory 330, and a position correcting circuit 350. The least-squares method displacement calculating circuit 322 includes a normal matrix element calculating unit 370, a dimension judging unit 380, and a displacement calculating unit 390. The dimension judging unit 380 includes a determinant absolute value calculating unit 382 and a trace calculating unit 384. The alignment circuit 140 receives reference data from the reference circuit 112 and measurement data from the optical image acquiring unit 150, performs the alignment of these items of data, and outputs the reference data and the measurement data to the comparing circuit 108. The data etc. calculated in the alignment circuit 140 is stored in the calculation data memory 330 as needed.

Figure 3:
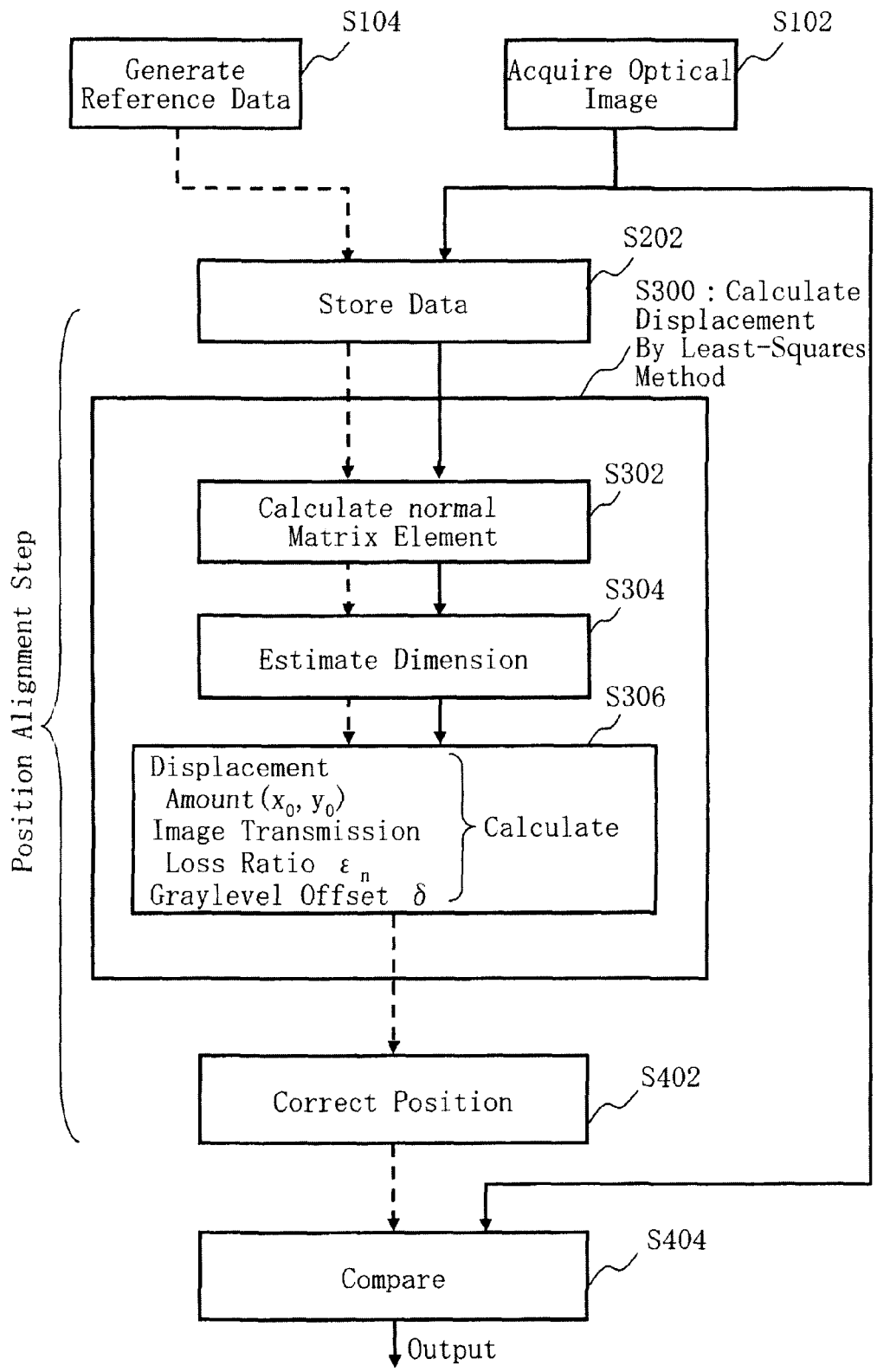
FIG. 3 is a flowchart showing main steps of pattern inspection method described in Embodiment 1.

FIG. 3 is a flowchart showing main steps of pattern inspection method described in Embodiment 1. In the figure, the target workpiece inspection method deploys a series of steps including an optical image acquiring step (S102), a reference data generating step (S104), an alignment step, and a comparing step (S404). As the alignment step being one example of an image alignment method, a series of steps including a storing step (S202), a least-squares method displacement calculating step (S300), and a position correcting step (S402) is deployed. Moreover, in the least-squares method displacement calculating step (S300), a series of steps including a normal matrix element calculating step (S302), a dimension judging step (S304) and a calculating step (S306) of a displacement amount, an image transmission loss ratio (or "image strength fluctuation rate") and a graylevel offset is executed. In FIG. 3, a solid line shows a flow of measurement data (optical image), and a dotted line shows a flow of reference data.

In S (step) 102, as the optical image acquiring step, the optical image acquiring unit 150 acquires an optical image of a photomask 101 serving as pattern on which a figure indicated by figure data included in design data is drawn based on the design data. More specifically, the optical image can be acquired as follows:

The photomask 101 serving as pattern to be inspected is placed on the XYθ table 102 which is movable in a horizontal direction and a rotating direction by the X-, Y-, and θ-axis motors. The pattern written on the photomask 101 is irradiated with lights from the appropriate light source 103 arranged above the XYθ table 102. The photomask 101 serving as pattern is irradiated with a flux of light from the light source 103, through the illumination optical system 170. Below the photomask 101, the magnifying optical system 104, the photodiode array 105, and the sensor circuit 106 are arranged. The light transmitted through the photomask 101 serving as pattern such as an exposure mask is focused on the photodiode array 105 as an optical image, through the magnifying optical system 104 and enters the photodiode array 105.

Figure 4:
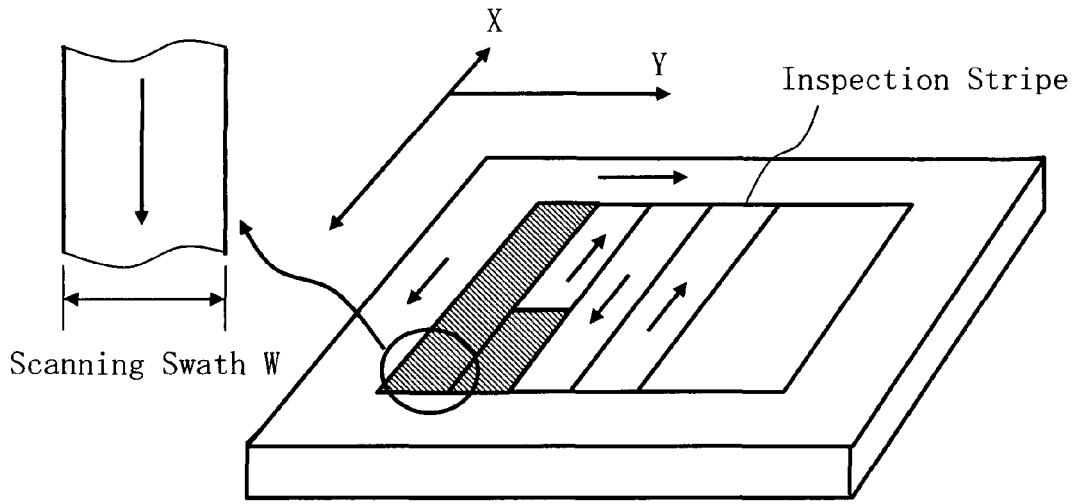
FIG. 4 shows a drawing for explaining procedures of acquiring an optical image described in Embodiment 1.

FIG. 4 shows a diagram for explaining a procedure for acquiring an optical image described in Embodiment 1. As shown in the figure, a region to be inspected is virtually divided into a plurality of strip-like inspection stripes, each of which has a scanning swath W, in the Y direction. To acquire an optical image, the movement of the XYθ table 102 is controlled so that each of the divided inspection stripes can be continuously scanned, while moving in the X direction. In the photodiode array 105, images each having the scanning swath W as shown in FIG. 4 are continuously input. After images on the first inspection stripe having been scanned, images each having the scanning swath W are continuously input while an image on the second inspection stripe is moved in the reverse direction. When an image on the third inspection stripe is to be acquired, the image is scanned while the image is moved in the direction reverse to the direction for scanning the image on the second inspection stripe, i.e., the same direction for scanning the image on the first inspection stripe. Continuously acquiring images in this manner makes it possible to reduce wasteful processing time.

The image of the pattern focused on the photodiode array 105 is photoelectrically converted by the photodiode array 105. Furthermore, the electric image is A/D-converted (analog to digital converted) by the sensor circuit 106. In the photodiode array 105, a sensor such as a TDI (Time Delay Integration) sensor is arranged. The TDI sensor scans the image of the pattern of the photomask 101 serving as pattern, by continuously moving the XYθ table 102 serving as a stage in the X-axis direction. The light source 103, the magnifying optical system 104, the photodiode array 105, and the sensor circuit 106 compose an inspection optical system having a large magnification.

The XYθ table 102 is driven by the table control circuit 114 under the control of the control calculator 110. The XYθ table 102 can be moved by a drive system such as a three-axis (X-Y-θ) motor which drives the XYθ table 102 in the X direction, the Y direction, and the θ direction.

Measurement data (optical image) output from the sensor circuit 106 is transmitted to the alignment circuit 140 together with data which is output from the position circuit 107 and indicates the position of the photomask 101 on the XYθ table 102. The measurement pattern data is, for example, 8-bit unsigned data, and indicates a graylevel of brightness of each pixel. The measurement data is compared with each image data of 512×512 pixels, for example.

Then, in step S104, as the reference data generating step, the reference circuit 112 generates reference data (reference image) for comparing with measurement data on the basis of design data of the photo mask 101 serving as pattern to be inspected. The reference data to be compared is generated as image data of 512×512 pixels, for example, like the measurement data.

The reference data herein is generated based on the design data in order to execute a "die to database inspection", but it does not restricted to this. A "die to die inspection" can also be conducted, and in this case, reference data can be generated based on another measurement data (optical image) to be used for comparison.

Next, as the alignment step, aligning is performed for comparing the measurement data and the reference data.

In step S202, as the storing step, reference data, for each 512×512 pixels for example as stated above, is read using the control calculator 110 and stored in the reference data memory 302. In the same manner, measurement data, for each 512×512 pixels for example, is read and stored in the measurement data memory 304. Next, a least-squares method displacement calculation is performed. An amount of displacement needed for alignment is herein calculated using the least-squares method being a statistical method.

Supposing that a graylevel value (pixel value) of measurement data serving as an optical image (actual image) is S (x, y), a displacement amount in the directions of X and Y of the graylevel value S(x, y) of the measurement data is ($x_0$, $y_0$), an image transmission loss ratio is $\epsilon_i$, a graylevel offset is $\delta$, and a pixel number is N+1, the equation (1) shown below can be obtained with respect to a graylevel value U(x, y) of reference data serving as a reference image.

$$S(x, y) = U(x - x_0, y - y_0) - \sum_{i=0}^{N} \epsilon_i U^{i+1}(x - x_0, y - y_0) - \delta \qquad (1)$$

Moreover, by linearization on supposition that the fluctuation amount is small enough, the equation (2) shown below can be obtained.

$$U(x, y) - S(x, y) = x_0 \frac{\partial U}{\partial x} + y_0 \frac{\partial U}{\partial y} + \sum_{i=0}^{N} \epsilon_i U^{i+1} + \delta \qquad (2)$$

wherein ∂U/∂x is a partial differential (space differentiation) of U by x, and ∂U/∂y lay is a partial differential (space differentiation) of U by y.

In step S302, as the normal matrix element calculating step, the normal matrix element calculating unit 370 calculates a plurality of elements of the normal matrix for the least-squares method, for calculating a displacement amount ($x_0$, $y_0$) displaced from the preliminary alignment position between the measurement data and the reference data. Specifically, with respect to each pixel of a two-dimensional image, a graylevel value U (x, y) of reference data, a value (U-S) obtained by subtracting a graylevel of the measurement data serving as an actual image from a graylevel of the reference data, a value (∂U/∂x) obtained by space differentiating the graylevel of the reference data in the X direction, and a value (∂U/∂y) obtained by space differentiating the graylevel of the reference data in the Y direction are calculated to obtain each element of the equation (3) of the correlation matrix shown below. Moreover, as the preliminary alignment position, a position tentatively in accordance in the data coordinate system can be used.

$$\begin{pmatrix} \sum \left(\frac{\partial U}{\partial x}\right)^2 & \sum \frac{\partial U}{\partial x} \cdot \frac{\partial U}{\partial y} & \sum \frac{\partial U}{\partial x} \cdot U & \cdots & \sum \frac{\partial U}{\partial x} \cdot U^N & \sum \frac{\partial U}{\partial x} \\ \sum \frac{\partial U}{\partial y} \cdot \frac{\partial U}{\partial x} & \sum \left(\frac{\partial U}{\partial y}\right)^2 & \sum \frac{\partial U}{\partial y} \cdot U & \cdots & \sum \frac{\partial U}{\partial y} \cdot U^N & \sum \frac{\partial U}{\partial y} \\ \sum U \cdot \frac{\partial U}{\partial x} & \sum U \cdot \frac{\partial U}{\partial y} & \sum U^2 & \cdots & \sum U^{N+1} & \sum U \\ \vdots & \vdots & \vdots & & \vdots & \vdots \\ \sum U^N \cdot \frac{\partial U}{\partial x} & \sum U^N \cdot \frac{\partial U}{\partial y} & \sum U^{N+1} & \cdots & \sum U^{2N} & \sum U^N \\ \sum \frac{\partial U}{\partial x} & \sum \frac{\partial U}{\partial y} & \sum U & \cdots & \sum U^N & 1 \end{pmatrix} \begin{pmatrix} x_0 \\ y_0 \\ \varepsilon_0 \\ \vdots \\ \varepsilon_N \\ \delta \end{pmatrix} \quad (3)$$

$$\begin{pmatrix} \frac{\partial U}{\partial x}(U-S) \\ \frac{\partial U}{\partial y}(U-S) \\ \sum U(U-S) \\ \vdots \\ \sum U^N(U-S) \\ \sum (U-S) \end{pmatrix}$$

By solving the simultaneous equations (3), the displacement amount $(x_0, y_0)$ in the directions of X and Y, the image transmission loss ratios $\varepsilon_0$ to $\varepsilon_N$, and the graylevel offset $\delta$ can be obtained. In the pattern whose whole image range serves as a pattern (zero-dimensional pattern), such as a so-called no-structure pattern, the displacement amount $(x_0, y_0)$ in the directions X and Y should intrinsically be indeterminate. However, there is actually a case that a wrong value has been calculated as a solution, by influence of a noise etc. Moreover, for example, in the pattern which spreads in one direction with an arbitrary angle (one-dimensional pattern), such as a so-called line and space pattern (line & space pattern), the displacement amount $(x_0$ or $y_0)$ in the direction X or Y should intrinsically be indeterminate. Actually, there is a case that the solution becomes unstable.

Then, according to the present Embodiment, the type of a pattern to be compared is estimated. That is, it is estimated whether it is a zero-dimensional pattern, such as an no-structure pattern, a one-dimensional pattern with an arbitrary angle, such as a line & space pattern, or a two-dimensional pattern, such as a hole pattern and an L-shaped pattern. Then, solving is performed based on the method corresponding to the estimating result, and thereby an unstable solution can be eliminated.

In S304, as the dimension estimating step serving as an example of a pattern type estimating unit, the dimension estimating unit 380 estimates the type (dimension) of a pattern indicated by reference data, using some of a plurality of elements of the normal matrix shown in the equation (3). Specifically, the dimension is estimated by using the matrix (4) with two rows and two columns which is some of a plurality of elements of the normal matrix shown in the equation (3).

$$\begin{pmatrix} \sum \left(\frac{\partial U}{\partial x}\right)^2 & \sum \frac{\partial U}{\partial x} \frac{\partial U}{\partial y} \\ \sum \frac{\partial U}{\partial x} \frac{\partial U}{\partial y} & \sum \left(\frac{\partial U}{\partial y}\right)^2 \end{pmatrix} \quad (4)$$

As shown in the matrix (4), the following are used as elements of the 2×2 matrix: the total sum of differentiation values (∂U/∂x) (first differentiation value) obtained by space differentiating a graylevel value of reference data in the X direction with respect to each pixel, the total sum of differentiation values (∂U/∂y) (second differentiation value) obtained by space differentiating a graylevel value of reference data in the Y direction with respect to each pixel, the total sum of squared differentiation values (∂U/∂x), and the total sum of squared differentiation values (∂U/∂y). Then, the trace calculating unit 384 calculates a trace of the 2×2 matrix shown in the matrix (4). The determinant absolute value calculating unit 382 calculates an absolute value of the determinant of the 2×2 matrix shown in the matrix (4).

FIGS. 5A to 5C are shown for explaining dimension estimating described in Embodiment 1. The estimating is performed using predetermined threshold values $\theta_1$ and $\theta_2$. For example, when reference data is a so-called no-structure pattern (zero-dimension), the absolute value of a determinant of a matrix ideally becomes a value 0 (zero). When reference data is a so-called line pattern (one-dimension), the trace ideally becomes a value 0 (zero). In this case, the ideal value "0" (zero) can be obtained when the reference data is generated from design data. However, there may be a case that when the reference data is generated from measurement data, like the case of "die to die inspection", the ideal value "0" cannot be obtained because it is affected by a noise etc. Then, in Embodiment 1, the estimating is performed by using predetermined threshold values $\theta_1$ and $\theta_2$ which are in consideration of the case that it is affected by the noise etc.

As shown in FIG. 5A, when the trace is smaller than the threshold value $\theta_1$ (first threshold value) and the absolute value of the matrix determinant is smaller than the threshold value $\theta_2$ (second threshold value), it is estimated that the type of a pattern is an no-structure pattern (zero-dimension) meaning the whole image being a pattern. As shown in FIG. 5B, when the trace is greater than or equal to the threshold value $\theta_1$ and the absolute value of the matrix determinant is smaller than the threshold value $\theta_2$, it is estimated that the type of a pattern is a line & space pattern (one-dimension) with an arbitrary angle. As shown in FIG. 5C, when the trace is greater than or equal to the threshold value $\theta_1$ and the absolute value of the matrix determinant is greater than or equal to the threshold value $\theta_2$, it is estimated to be other pattern (two-dimension).

When estimated to be zero-dimension, since the differentiation value ($\partial U/\partial x$) and the differentiation value ($\partial U/\partial y$) intrinsically become "0", the equation (3) of the correlation matrix can be rank deficient (rank number 1) as shown in the equation (5) by deleting the normal matrix elements including the above differentiation values.

$$\begin{pmatrix} \sum U^2 & \cdots & \sum U^{N+1} & \sum U \\ \vdots & \vdots & \vdots & \vdots \\ \sum U^{N+1} & \cdots & \sum U^{2N} & \sum U^N \\ \sum U & \cdots & \sum U^N & 1 \end{pmatrix} \begin{pmatrix} \varepsilon_0 \\ \vdots \\ \varepsilon_N \\ \delta \end{pmatrix} = \begin{pmatrix} \sum U(U-S) \\ \vdots \\ \sum U^N(U-S) \\ \sum (U-S) \end{pmatrix} \quad (5)$$

By performing the above, the elements related with the displacement amount ($x_0$, $y_0$) in the directions X and Y whose solution intrinsically becomes indeterminate are deleted from the simultaneous equations. Consequently, it becomes possible to prevent calculating and obtaining a wrong value with respect to the displacement amount ($x_0$, $y_0$). The normal matrix elements including the differentiation value ($\partial u/\partial x$) and the differentiation value ($\partial U/\partial y$) are deleted herein, but the same result can be obtained by defining the elements to be a value 0 (zero) instead of deleting.

When estimated to be one-dimension, the normal matrix element including selected one of the differentiation value ($\partial U/\partial x$) and the differentiation value ($\partial U/\partial y$) is deleted as mentioned below. That is, the equation (3) of the correlation matrix becomes rank deficient as shown in the equation (6) or the equation (7) (rank number 2).

$$\begin{pmatrix} \sum \left(\frac{\partial U}{\partial x}\right)^2 & \sum \frac{\partial U}{\partial x}U & \cdots & \sum \frac{\partial U}{\partial x}U^N & \sum \frac{\partial U}{\partial x} \\ \sum U\frac{\partial U}{\partial x} & \sum U^2 & \cdots & \sum U^{N+1} & \sum U \\ \vdots & \vdots & \vdots & \vdots \\ \sum U^N\frac{\partial U}{\partial x} & \sum U^{N+1} & \cdots & \sum U^{2N} & \sum U^N \\ \sum \frac{\partial U}{\partial x} & \sum U & \cdots & \sum U^N & 1 \end{pmatrix} \begin{pmatrix} x_0 \\ \varepsilon_0 \\ \vdots \\ \varepsilon_N \\ \delta \end{pmatrix} = \quad (6)$$

$$\begin{pmatrix} \sum \frac{\partial U}{\partial x}(U-S) \\ \sum U(U-S) \\ \vdots \\ \sum U^N(U-S) \\ \sum (U-S) \end{pmatrix}$$

Since the normal matrix elements including the differentiation value ($\partial U/\partial y$) are deleted in the equation (6), the equation (3) of the correlation matrix becomes rank deficient (rank number 2). As the result, $y_0$ can be regarded to be indeterminate.

$$\begin{pmatrix} \sum \left(\frac{\partial U}{\partial y}\right)^2 & \sum \frac{\partial U}{\partial y}U & \cdots & \sum \frac{\partial U}{\partial y}U^N & \sum \frac{\partial U}{\partial y} \\ \sum U\frac{\partial U}{\partial y} & \sum U^2 & \cdots & \sum U^{N+1} & \sum U \\ \vdots & \vdots & \vdots & \vdots \\ \sum U^N\frac{\partial U}{\partial y} & \sum U^{N+1} & \cdots & \sum U^{2N} & \sum U^N \\ \sum \frac{\partial U}{\partial y} & \sum U & \cdots & \sum U^N & 1 \end{pmatrix} \begin{pmatrix} y_0 \\ \varepsilon_0 \\ \vdots \\ \varepsilon_N \\ \delta \end{pmatrix} = \quad (7)$$

$$\begin{pmatrix} \sum \frac{\partial U}{\partial y}(U-S) \\ \sum U(U-S) \\ \vdots \\ \sum U^N(U-S) \\ \sum (U-S) \end{pmatrix}$$

Since the normal matrix elements including the differentiation value ($\partial U/\partial x$) are deleted in the equation (7), the equation (3) of the correlation matrix becomes rank deficient (rank number 2). As the result, $x_0$ can be regarded to be indeterminate.

Figure 6:
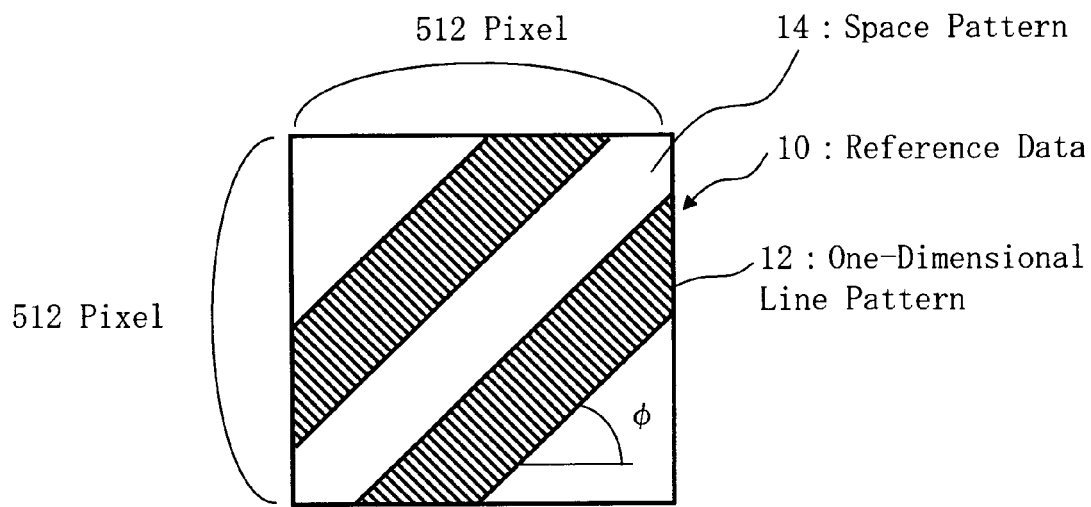
FIG. 6 shows an example of a line & space pattern with an arbitrary angle described in Embodiment 1.

FIG. 6 shows an example of the line & space pattern with an arbitrary angle described in Embodiment 1. In the figure, reference data 10 composed of a line pattern 12 and a space pattern 14 is shown as an example of the line & space pattern. The direction of the line & space pattern does not necessarily correspond with the X-axis or the Y-axis of a data coordinate system. The case of the line & space pattern ($\phi$=90 degrees) in the direction of Y will be explained as an example. First, the total sum of $(\partial U/\partial x)^2$ and the total sum of $(\partial U/\partial y)^2$, which are the normal matrix elements of the equation (3), are compared. Then, since the total sum of $(\partial U/\partial y)^2$ can be ignored when compared with the total sum of $(\partial U/\partial x)^2$, the normal matrix degenerates (rank deficient) by deleting the term including ($\partial U/\partial y$) from the correlation equation (3) of the normal matrix. As a result, $y_0$ can be regarded to be indeterminate. Similarly, the case of the line & space pattern ($\phi$=0 degree) in the direction of X is now explained as an example. The total sum of $(\partial U/\partial x)^2$ and the total sum of $(\partial U/\partial y)^2$ which are the normal matrix elements of the equation (3) are compared. Then, since the total sum of $(\partial U/\partial x)^2$ can be ignored when compared with the total sum of $(\partial U/\partial y)^2$, the normal matrix degenerates (rank deficient) by deleting the term including ($\partial U/\partial x$) from the correlation equation (3) of the normal matrix. As a result, $x_0$ can be regarded to be indeterminate. However, in the case of the line & space pattern with an arbitrary angle, a difference between the total sum of $(\partial U/\partial x)^2$ and the total sum of $(\partial U/\partial y)^2$ is sometimes not large enough to be ignored. Therefore, it is difficult to estimate a term to be deleted based on this method. Accordingly, in Embodiment 1, when estimated to be one-dimension as stated above, the element which includes either ($\partial U/\partial x$) or ($\partial U/\partial y$) is deleted by the following method.

Figure 7:
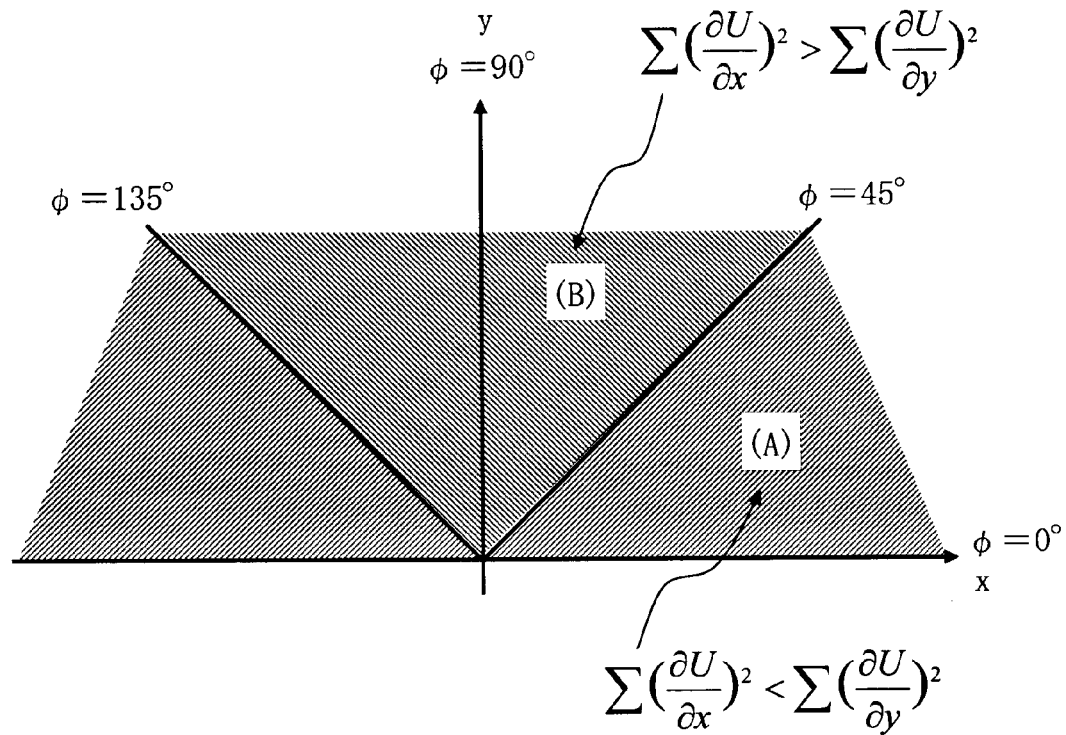
FIG. 7 is a diagram for explaining an angle range of the line & space pattern with an arbitrary angle described in Embodiment 1.

FIG. 7 is a diagram for explaining an angle range of the line & space pattern with an arbitrary angle described in Embodiment 1. In the figure, the X direction is 0 degree and the Y direction is 90 degrees, for example. In the reference data in FIG. 7, the case of the angle φ of the line & space pattern with an arbitrary angle being greater than or equal to 0 degree and less than 45 degrees or the case of the angle φ being greater than or equal to 135 degrees and less than or equal to 180 degrees is defined as a range A. The case of the angle φ of the line & space pattern with an arbitrary angle being greater than or equal to 45 degrees and less than 135 degrees is defined as a range B. In each range, the total sum of ($\partial U/\partial x$) 2 and the total sum of $(\partial U/\partial y)^2$ which are elements of the normal matrix of the equation (3) are compared.

FIGS. 8A and 8B are shown for explaining a method of deleting an element of the line & space pattern with an arbitrary angle described in Embodiment 1. When comparing the total sum of $(\partial U/\partial x)^2$ and the total sum of $(\partial U/\partial y)^2$ which are diagonal components, the total sum of $(\partial U/\partial x)^2$ is smaller than the total sum of $(\partial U/\partial y)^2$ in the range A, as shown in FIG. 8A. Then, in the case of a line & space pattern with an arbitrary angle corresponding to the range A in the reference data, the term including ($\partial U/\partial x$) is deleted from the correlation equation (3) of the normal matrix. This makes the normal matrix degenerate (rank deficient). As a result, $x_0$ can be regarded to be indeterminate. On the other hand, in the range B of the reference data, the total sum of $(\partial U/\partial y)^2$ is smaller than the total sum of $(\partial U/\partial x)^2$ as shown in FIG. 8B. Then, in the case of a line & space pattern with an arbitrary angle corresponding to the range B, the term including ($\partial U/\partial y$) is deleted from the correlation equation (3) of the normal matrix. This makes the normal matrix degenerate (rank deficient). As a result, $y_0$ can be regarded to be indeterminate.

That is, even in the case of the line & space pattern with an arbitrary angle, the above configuration makes it possible to delete an element including either one of ($\partial U/\partial x$) and ($\partial U/\partial y$) which are preferably to be intrinsically indeterminate.

When estimated to be two-dimension, since a solution being indeterminate is not generated, it is just necessary to solve the simultaneous equations of the correlation matrix shown in the equation (3) without deleting any element of the normal matrix (rank number 3).

As mentioned above, a correlation matrix corresponding to the pattern type can be obtained by estimating a dimension by using a trace and an absolute value of a determinant of matrix.

In step S306, as the calculating step of a displacement amount, an image transmission loss ratio, and a graylevel offset, which serves an example of the displacement amount calculating step, the displacement calculating unit 390 solves simultaneous equations of the normal matrix shown in the equation (5), (6), or (7) in which a predetermined element is deleted from a plurality of elements of the normal matrix, depending upon a pattern type respectively estimated, or solves the normal matrix shown in the equation (3) in which no element is deleted. By performing such a simultaneous equation solution step, a displacement amount ($x_0$, $y_0$) displaced from a preliminary alignment position obtained by the least-squares method, an image transmission loss ratio $\epsilon_0$ to $\epsilon_N$ and a graylevel offset δ can be calculated depending upon the type of a pattern. In the above explanation, description relating to each value of the matrix is partially omitted in the equations (3), (5), (6) and (7).

The above configuration makes it possible to achieve a solution depending upon a solution method suitable for each pattern type. Therefore, it becomes possible to obtain a displacement amount ($x_0$, $y_0$), an image transmission loss ratio $\epsilon_0$ to $\epsilon_N$ and a graylevel offset δ for alignment to the best position based on the least-squares method. Then, in calculating these solutions, it is possible to eliminate a solution which should intrinsically be indeterminate.

In step S402, as the position correcting step, the position correcting circuit 350 (an example of a position correcting unit) corrects an alignment position between measurement data and reference data from the preliminary alignment position to the position obtained by performing displacing by the displacement amount from the preliminary alignment position. In the case $x_0$ or $y_0$ being an indeterminate solution, the preliminary alignment position can be used without changing, with respect to the indeterminate solution. It is also preferable for the position correcting circuit 350 to correct the image strength of each pixel of reference data using the image transmission loss ratio $\epsilon_0$ to $\epsilon_N$ calculated by the least-squares method displacement calculating circuit 322. The result of the correcting is output to the comparing circuit 108.

In step S404, as the comparing step, the comparing circuit 108 aligns, by means of the position alignment circuit 140, the measurement data serving as a pattern image to be inspected generated by the sensor circuit 106 on the basis of the transfer image obtained from the photo mask 101, and the reference data serving as an inspection standard pattern image generated by the reference circuit 112, and takes in both the data. Then, the comparing circuit 108 compares them, namely the taken measurement data and reference data, with each other according to a predetermined algorithm, and estimates whether there is a defect or not. The comparing circuit 108 outputs the result of the comparing. Thus, by performing a data comparison through such a highly precise alignment, it is possible to prevent a false detection of a defect and to decrease pseudo defects, thereby performing a highly precise inspection.

Embodiment 2

A method of correcting a local displacement in a frame will be explained in Embodiment 2.

Figure 9:
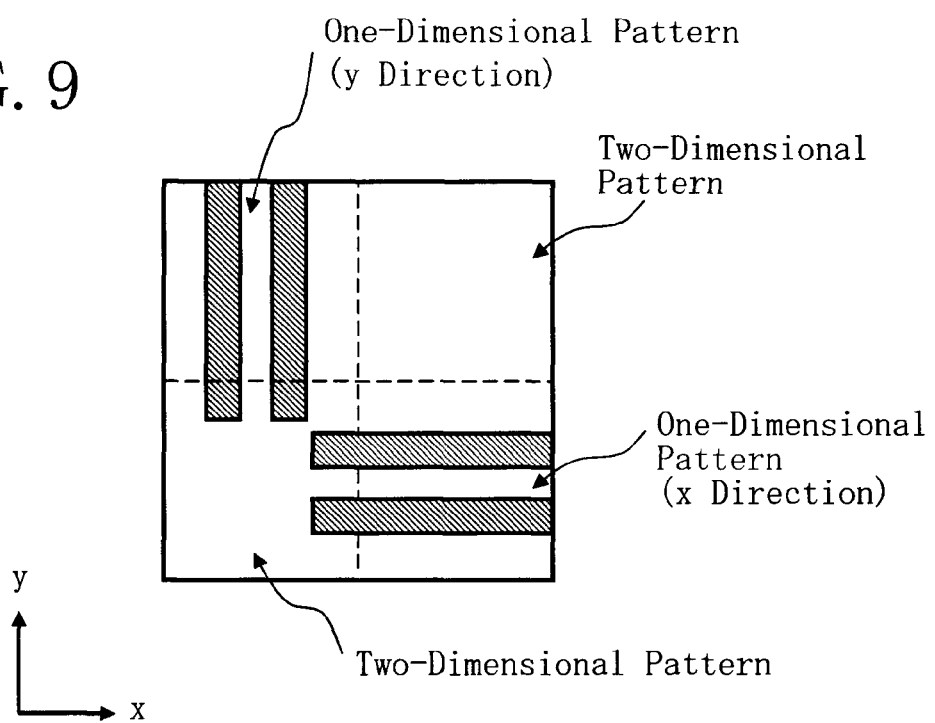
FIG. 9 shows an example of a two-dimensional pattern described in Embodiment 2.

FIG. 9 shows an example of a two-dimensional pattern described in Embodiment 2. For example, the case where a local displacement occurs in a part of the two-dimensional pattern shown in FIG. 9 will be explained. In the least-squares method, it is preferable to divide such a frame by dot lines as shown in FIG. 9 for example, to calculate a displacement amount and an image transmission loss ratio for each of the divided areas, and to estimate the displacement amount and the image transmission loss ratio, respectively. In such a case, when the divided areas are configured by a zero dimensional pattern, normal matrices can be degenerated to make $x_0$ and $y_0$ become indeterminate, as explained in Embodiment 1. Similarly, when the divided areas are configured by a one-dimensional pattern, regular matrices can be degenerated respectively to make either $x_0$ or $y_0$ become indeterminate, as explained in Embodiment 1. Consequently, it is possible to perform a highly precise displacement correction by composing the respective divided areas.

Further, in the least-squares method, when dividing the above-mentioned frame by dot lines as shown in FIG. 8, it is also preferable to divide the frame by weighting, to calculate a displacement amount for each of the divided areas, and to estimate the displacement amount and the image transmission loss ratio, respectively.

Figure 10:
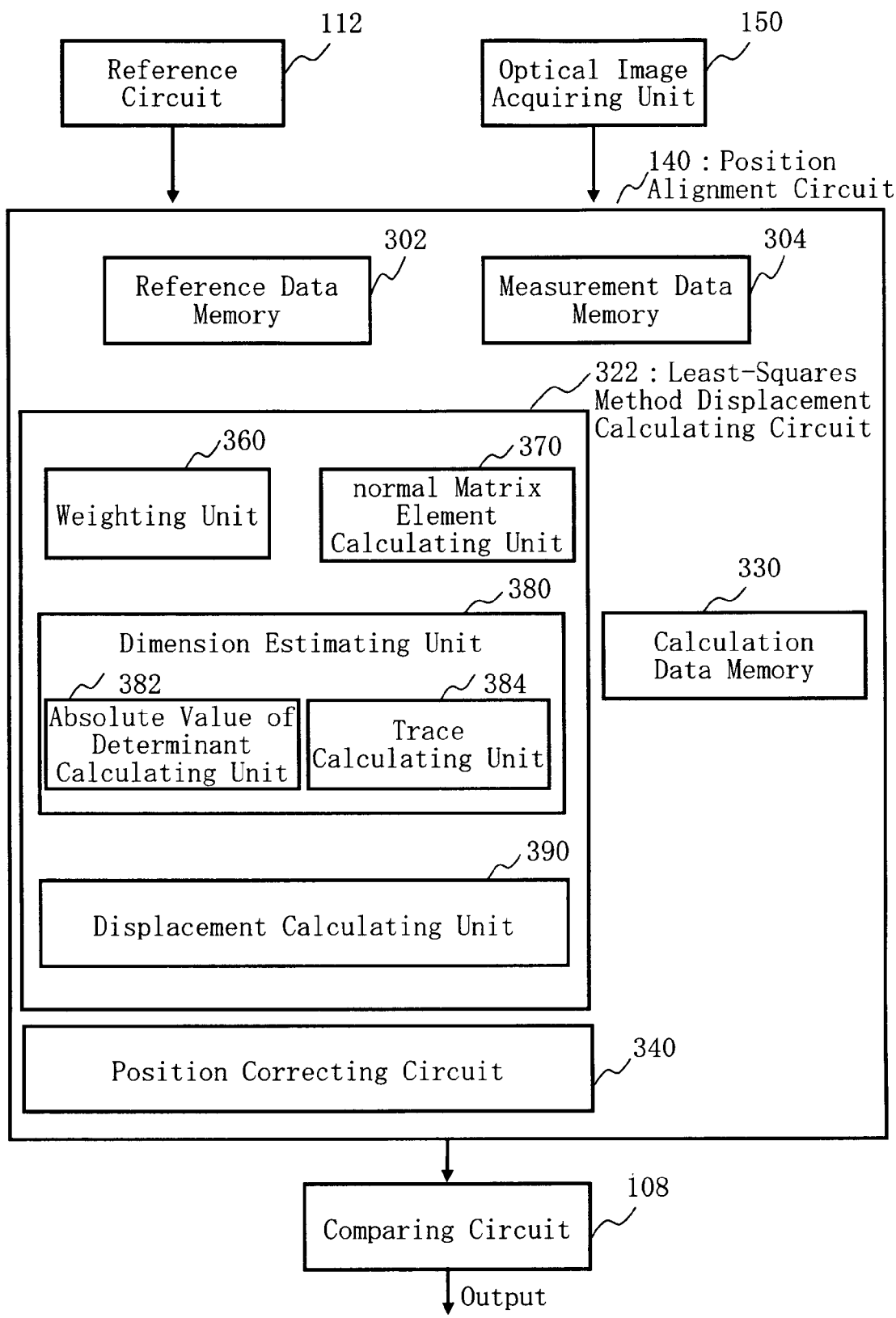
FIG. 10 is a block diagram showing the structure of an alignment circuit described in Embodiment 2.

FIG. 10 is a block diagram showing the structure of the alignment circuit in Embodiment 2. In the figure, the alignment circuit 140 further includes a weighting unit 360 in the least-squares method displacement calculating circuit 322 in addition to the structure shown in FIG. 2. Namely, FIG. 10 is the same as FIG. 2 except for the weighting unit 360 added.

Figure 11:
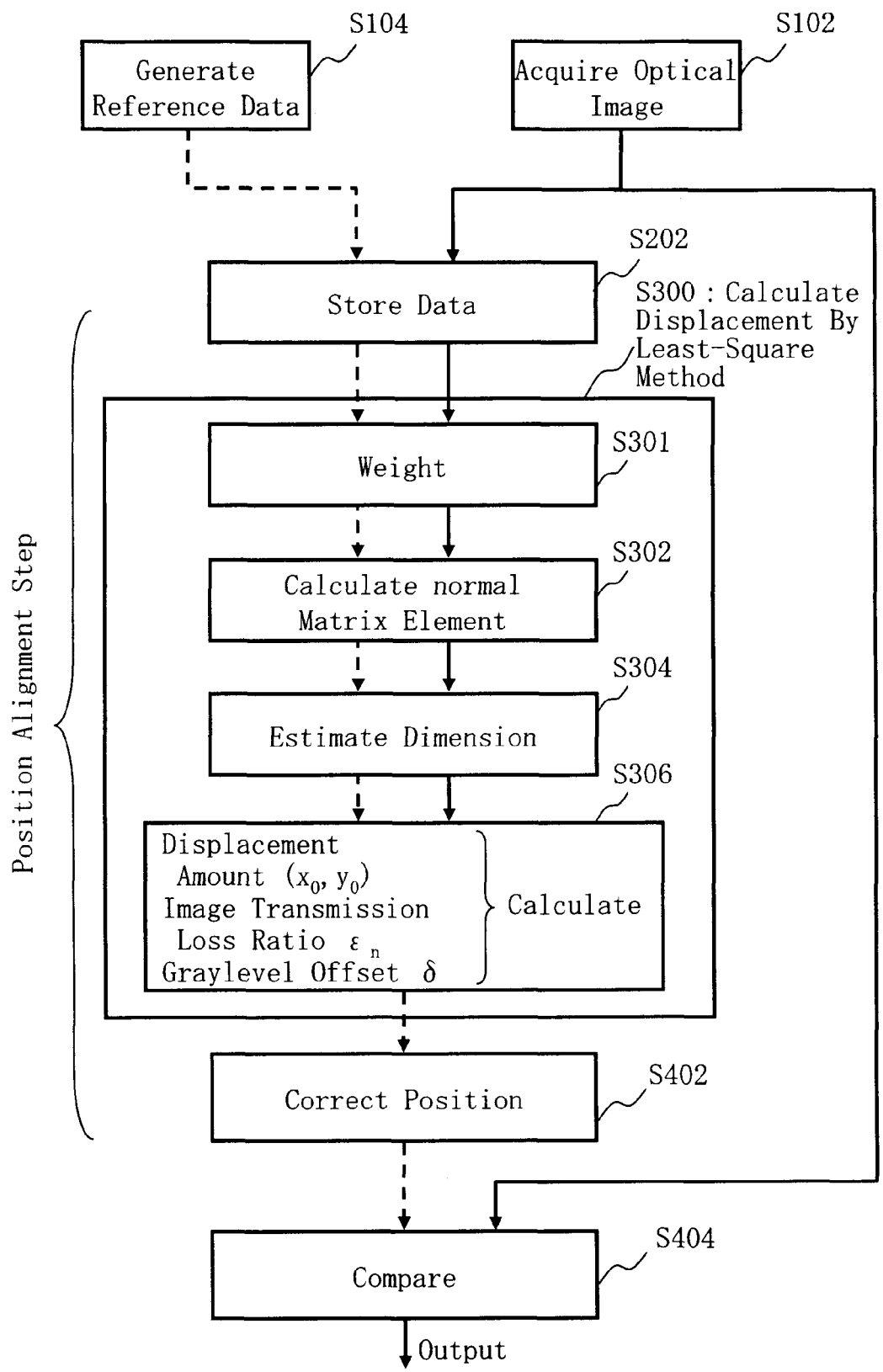
FIG. 11 is a flowchart showing main steps of pattern inspection method described in Embodiment 2.

FIG. 11 is a flowchart showing main steps of pattern inspection method described in Embodiment 2. In the figure, a weighting step (S301) is added before the normal matrix element calculating step (S302) in the least-squares method displacement calculating step (S300) in addition to the steps shown in FIG. 3. Namely, FIG. 11 is the same as FIG. 3 except for the weighting step S301 added. Furthermore, each step of the apparatus structure and the target workpiece inspection method or the image alignment method in Embodiment 2 is the same as that of Embodiment 1.

In step S301, as the weighting step, the weighting unit 360 calculates a weighting factor for performing weighting by one-dimensional linear interpolation. The weighting unit 360 calculates a value multiplied by the weighting factor with respect to each graylevel value of reference data.

Figure 12:
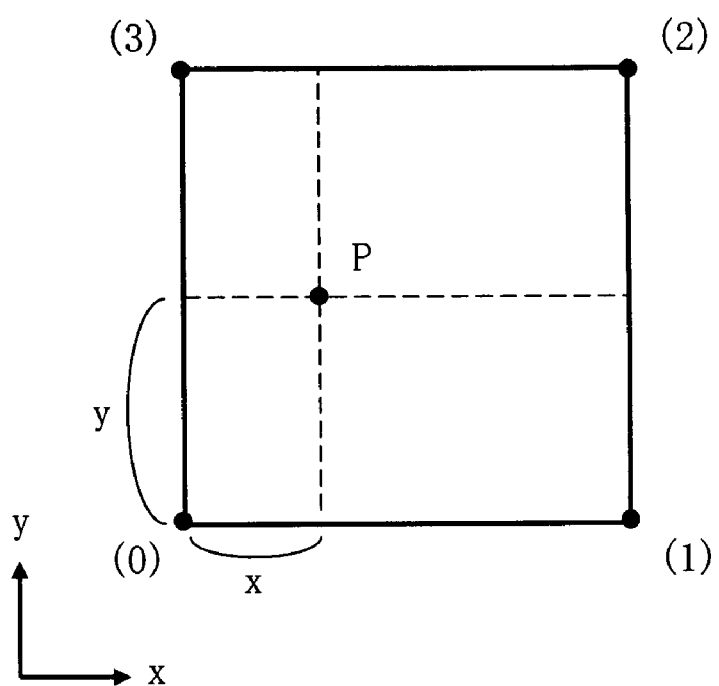
FIG. 12 shows a drawing for explaining weighting with two-dimensional linear interpolation described in Embodiment 2.

FIG. 12 is a drawing for explaining weighting by one-dimensional linear interpolation in Embodiment 2. The case where weighting is performed at neighboring four points will now be explained. For example, with regard to certain image data P, when a pixel P is interpolated by use of image data of four points (0, 1, 2, 3) therearound, the following equation (8) can be defined.

$$\begin{cases} U_{(0)} = (1-x)(1-y)U = W_{(0)}U \\ U_{(1)} = x(1-y)U = W_{(1)}U \\ U_{(2)} = xyU = W_{(2)}U \\ U_{(3)} = (1-x)yU = W_{(3)}U \end{cases} \quad (8)$$

That is, as shown in a method (8), a graylevel value $U_{(0)}$ of reference data can be expressed by $U(0)=(1-x)(1-y)U$. When $(1-x)(1-y)$ expresses a weighting factor $W_{(0)}$, the graylevel value can be expressed as $U_{(0)}=W_{(0)}U$. Moreover, reference data $U_{(1)}$ can be expressed by $U_{(1)}=x(1-y)U$. When $x(1-y)$ expresses a weighting factor $W_{(1)}$, the reference data can be expressed as $U_{(1)}=W_{(1)}U$. Moreover, reference data $U_{(2)}$ can be expressed by $U_{(2)}=xyU$. When $xy$ expresses a weighting factor $W_{(2)}$, the reference data can be expressed as $U_{(2)}=W_{(2)}U$. Moreover, reference data $U_{(3)}$ can be expressed by $U_{(3)}=(1-x)yU$. When $(1-x)y$ expresses a weighting factor $W_{(3)}$, the reference data can be expressed as $U_{(3)}=W_{(3)}U$. Thus, if a correlation matrix is calculated by use of the weighted reference data $U_{(0)}$, reference data $U_{(1)}$, reference data $U_{(2)}$, and reference data $U_{(3)}$, the correlation matrix can be shown as the equation (9).

$$\begin{pmatrix} a & b & c & d \\ e & f & g & h \\ i & j & k & l \\ m & n & p & q \end{pmatrix} \begin{pmatrix} A \\ B \\ C \\ D \end{pmatrix} = \begin{pmatrix} A' \\ B' \\ C' \\ D' \end{pmatrix} \quad (9)$$

where each element a to d in the equation (9) can be expressed as the following equation (10).

$$\begin{cases} a = \begin{pmatrix} \sum \left(\frac{\partial U_{(0)}}{\partial x}\right)^2 & \cdots & \sum \frac{\partial U_{(0)}}{\partial x}\frac{\partial U_{(3)}}{\partial x} \\ \vdots & \ddots & \vdots \\ \sum \frac{\partial U_{(3)}}{\partial x}\frac{\partial U_{(0)}}{\partial x} & \cdots & \sum \left(\frac{\partial U_{(3)}}{\partial x}\right)^2 \end{pmatrix}, & c = \begin{pmatrix} \sum \frac{\partial U_{(0)}}{\partial x}U_{(0)} & \cdots & \sum \frac{\partial U_{(0)}}{\partial x}U_{(3)}^N \\ \vdots & \ddots & \vdots \\ \sum \frac{\partial U_{(3)}}{\partial x}U_{(0)} & \cdots & \sum \frac{\partial U_{(3)}}{\partial x}U_{(3)}^N \end{pmatrix} \\ b = \begin{pmatrix} \sum \frac{\partial U_{(0)}}{\partial x}\frac{\partial U_{(0)}}{\partial y} & \cdots & \sum \frac{\partial U_{(0)}}{\partial x}\frac{\partial U_{(3)}}{\partial y} \\ \vdots & \ddots & \vdots \\ \sum \frac{\partial U_{(3)}}{\partial x}\frac{\partial U_{(0)}}{\partial y} & \cdots & \sum \frac{\partial U_{(3)}}{\partial x}\frac{\partial U_{(3)}}{\partial y} \end{pmatrix}, & d = \begin{pmatrix} \sum \frac{\partial U_{(0)}}{\partial x}W_{(0)} & \cdots & \sum \frac{\partial U_{(0)}}{\partial x}W_{(3)} \\ \vdots & \ddots & \vdots \\ \sum \frac{\partial U_{(3)}}{\partial x}W_{(0)} & \cdots & \sum \frac{\partial U_{(3)}}{\partial x}W_{(3)} \end{pmatrix} \end{cases} \quad (10)$$

Moreover, each element e to h in the equation (9) can be expressed as the following equation (11).

$$\begin{cases} e = \begin{pmatrix} \sum \frac{\partial U_{(0)}}{\partial y}\frac{\partial U_{(0)}}{\partial x} & \cdots & \sum \frac{\partial U_{(0)}}{\partial y}\frac{\partial U_{(3)}}{\partial x} \\ \vdots & \ddots & \vdots \\ \sum \frac{\partial U_{(3)}}{\partial y}\frac{\partial U_{(0)}}{\partial x} & \cdots & \sum \frac{\partial U_{(3)}}{\partial y}\frac{\partial U_{(3)}}{\partial x} \end{pmatrix}, & g = \begin{pmatrix} \sum \frac{\partial U_{(0)}}{\partial y}U_{(0)} & \cdots & \sum \frac{\partial U_{(0)}}{\partial y}U_{(3)}^N \\ \vdots & \ddots & \vdots \\ \sum \frac{\partial U_{(3)}}{\partial y}U_{(0)} & \cdots & \sum \frac{\partial U_{(3)}}{\partial y}U_{(3)}^N \end{pmatrix} \\ f = \begin{pmatrix} \sum \left(\frac{\partial U_{(0)}}{\partial y}\right)^2 & \cdots & \sum \frac{\partial U_{(0)}}{\partial y}\frac{\partial U_{(3)}}{\partial y} \\ \vdots & \ddots & \vdots \\ \sum \frac{\partial U_{(3)}}{\partial y}\frac{\partial U_{(0)}}{\partial y} & \cdots & \sum \left(\frac{\partial U_{(3)}}{\partial y}\right)^2 \end{pmatrix}, & h = \begin{pmatrix} \sum \frac{\partial U_{(0)}}{\partial y}W_{(0)} & \cdots & \sum \frac{\partial U_{(0)}}{\partial y}W_{(3)} \\ \vdots & \ddots & \vdots \\ \sum \frac{\partial U_{(3)}}{\partial y}W_{(0)} & \cdots & \sum \frac{\partial U_{(3)}}{\partial y}W_{(3)} \end{pmatrix} \end{cases} \quad (11)$$

Moreover, each element i to l in the equation (9) can be expressed as the following equation (12).

$$\begin{cases} i = \begin{pmatrix} \sum U_{(0)}\frac{\partial U_{(0)}}{\partial x} & \cdots & \sum U_{(0)}\frac{\partial U_{(3)}}{\partial x} \\ \vdots & \ddots & \vdots \\ \sum U_{(3)}^N\frac{\partial U_{(0)}}{\partial x} & \cdots & \sum U_{(3)}^N\frac{\partial U_{(3)}}{\partial x} \end{pmatrix}, & k = \begin{pmatrix} \sum U_{(0)}^2 & \cdots & \sum U_{(0)}U_{(3)}^N \\ \vdots & \ddots & \vdots \\ \sum U_{(3)}^N U_{(0)} & \cdots & \sum U_{(3)}^{2N} \end{pmatrix} \\ j = \begin{pmatrix} \sum U_{(0)}\frac{\partial U_{(0)}}{\partial y} & \cdots & \sum U_{(0)}\frac{\partial U_{(3)}}{\partial y} \\ \vdots & \ddots & \vdots \\ \sum U_{(3)}^N\frac{\partial U_{(0)}}{\partial y} & \cdots & \sum U_{(3)}^N\frac{\partial U_{(3)}}{\partial y} \end{pmatrix}, & l = \begin{pmatrix} \sum U_{(0)}W_{(0)} & \cdots & \sum U_{(0)}W_{(3)} \\ \vdots & \ddots & \vdots \\ \sum U_{(3)}W_{(0)} & \cdots & \sum U_{(3)}W_{(3)} \end{pmatrix} \end{cases} \quad (12)$$

Moreover, each element m to q in the equation (9) can be expressed as the following equation (13).

$$\begin{cases} m = \begin{pmatrix} \sum W_{(0)}\frac{\partial U_{(0)}}{\partial x} & \cdots & \sum W_{(0)}\frac{\partial U_{(3)}}{\partial x} \\ \vdots & \ddots & \vdots \\ \sum W_{(3)}^N\frac{\partial U_{(0)}}{\partial x} & \cdots & \sum W_{(3)}^N\frac{\partial U_{(3)}}{\partial x} \end{pmatrix}, & p = \begin{pmatrix} \sum W_{(0)}U_{(0)} & \cdots & \sum W_{(0)}U_{(3)}^N \\ \vdots & \ddots & \vdots \\ \sum W_{(3)}^N U_{(0)} & \cdots & \sum W_{(3)}U_{(3)} \end{pmatrix} \\ n = \begin{pmatrix} \sum W_{(0)}\frac{\partial U_{(0)}}{\partial y} & \cdots & \sum W_{(0)}\frac{\partial U_{(3)}}{\partial y} \\ \vdots & \ddots & \vdots \\ \sum W_{(3)}\frac{\partial U_{(0)}}{\partial y} & \cdots & \sum W_{(3)}\frac{\partial U_{(3)}}{\partial y} \end{pmatrix}, & q = \begin{pmatrix} \sum W_{(0)}^2 & \cdots & \sum W_{(0)}W_{(3)} \\ \vdots & \ddots & \vdots \\ \sum W_{(3)}W_{(0)} & \cdots & \sum W_{(3)}^2 \end{pmatrix} \end{cases} \quad (13)$$

Moreover, each element A to D in the equation (9) can be expressed as the following equation (14).

$$\begin{cases} A = \begin{pmatrix} x_{0_{(0)}} \\ \vdots \\ x_{0_{(3)}} \end{pmatrix}, & C = \begin{pmatrix} \varepsilon_{0_{(0)}} \\ \vdots \\ \varepsilon_{N_{(3)}} \end{pmatrix} \\ B = \begin{pmatrix} y_{0_{(0)}} \\ \vdots \\ y_{0_{(3)}} \end{pmatrix}, & D = \begin{pmatrix} \delta_{(0)} \\ \vdots \\ \delta_{(3)} \end{pmatrix} \end{cases} \quad (14)$$

Moreover, each element A' to D' in the equation (9) can be expressed as the following equation (15).

$$\begin{cases} A' = \begin{pmatrix} \sum \frac{\partial U_{(0)}}{\partial x}(U_{(0)} - S_{(0)}) \\ \vdots \\ \sum \frac{\partial U_{(3)}}{\partial x}(U_{(3)} - S_{(3)}) \end{pmatrix}, & C' = \begin{pmatrix} \sum U_{(0)}(U_{(0)} - S_{(0)}) \\ \vdots \\ \sum U_{(3)}^N(U_{(3)} - S_{(3)}) \end{pmatrix} \\ B' = \begin{pmatrix} \sum \frac{\partial U_{(0)}}{\partial y}(U_{(0)} - S_{(0)}) \\ \vdots \\ \sum \frac{\partial U_{(3)}}{\partial y}(U_{(3)} - S_{(3)}) \end{pmatrix}, & D' = \begin{pmatrix} \sum W_{(0)}(U_{(0)} - S_{(0)}) \\ \vdots \\ \sum W_{(3)}(U_{(3)} - S_{(3)}) \end{pmatrix} \end{cases} \quad (15)$$

As mentioned above, when weighting is performed at neighboring four points, the correlation matrix equations shown in equations (9) to (15) are solved to obtain 4(N+4) variables, such as image transmission loss ratios $\epsilon_{0(0)}$ to $\epsilon_{N(3)}$, displacement amounts $x_{0(0)}$, $x_{0(1)}$, $x_{0(2)}$, $x_{0(3)}$, $y_{0(0)}$, $y_{0(1)}$, $y_{0(2)}$, and $y_{0(3)}$, and graylevel offsets $\delta_{(0)}$ to $\delta_{(3)}$. When indeterminate solutions exist, it should be understood that the number of the indeterminate solutions are to be excluded. Position correction can be performed by use of such values to correct a local displacement and the like in the frame. Causes of the local displacement may include (1) meandering of the XY stage, (2) a pixel size difference between an actual image and a reference image, and (3) a pixel size difference between image scanning elements. The weighting method is not limited to the one using neighboring 4 points. It is also preferable to adopt bicubic interpolation using 16 points or the like. In the equations (1) to (15), description of values of the matrix is partly omitted.

Embodiment 3

In Embodiments 1 and 2 mentioned above, as the alignment method, a displacement amount calculated by the least-squares method displacement calculation in which dimension is estimated and a correlation matrix is made to be rank deficient according to a pattern type is used. In Embodiment 3, in addition to the least-squares method mentioned above, an alignment method where a SSD (Sum of the Squared Difference) method is combined with the least-squares method will be explained. Specifically, the case where a sub-pixel unit SSD calculation and the least-squares method displacement calculation are performed in parallel will be described in Embodiment 3.

Figure 13:
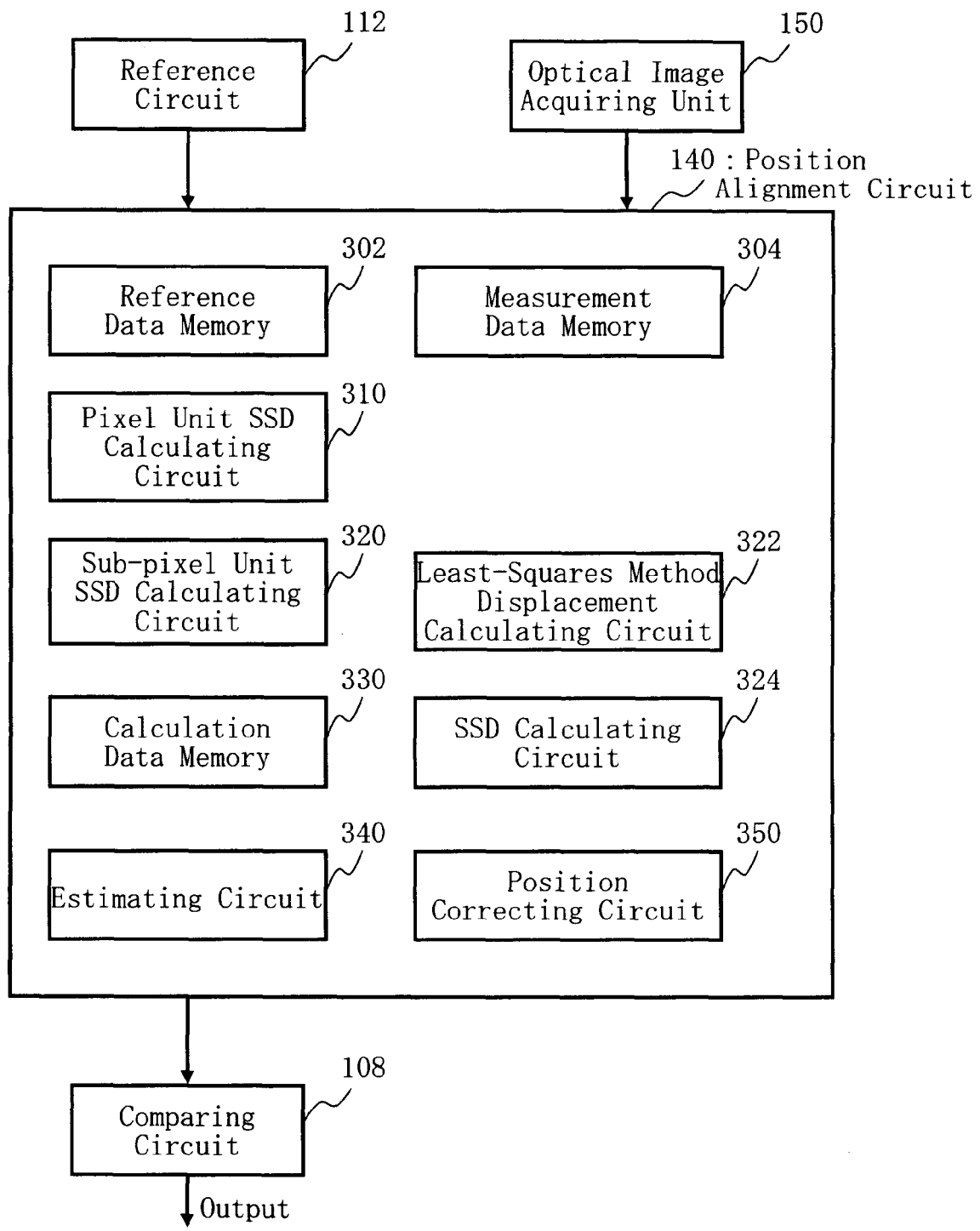
FIG. 13 is a block diagram showing the structure of an alignment circuit described in Embodiment 3.

FIG. 13 is a block diagram showing an example of the structure of the alignment circuit described in Embodiment 3. In the figure, the alignment circuit 140 includes the reference data memory 302, the measurement data memory 304, a pixel unit SSD calculating circuit 310, a sub-pixel unit SSD calculating circuit 320, the least-squares method displacement calculating circuit 322, the calculation data memory 330, an SSD (or "Residual Sum of Square (RSS)") calculating circuit 324, a estimating circuit 340, and a position correcting circuit 350. The position alignment circuit 140 receives reference data from the reference circuit 112 and measurement data from the optical image acquiring unit 150, performs the alignment of these items of data, and outputs the reference data and the measurement data to the comparing circuit 108. Each of the configuration in the least-squares method displacement calculating circuit 322 is the same as that of FIG. 2 or FIG. 10.

Figure 14:
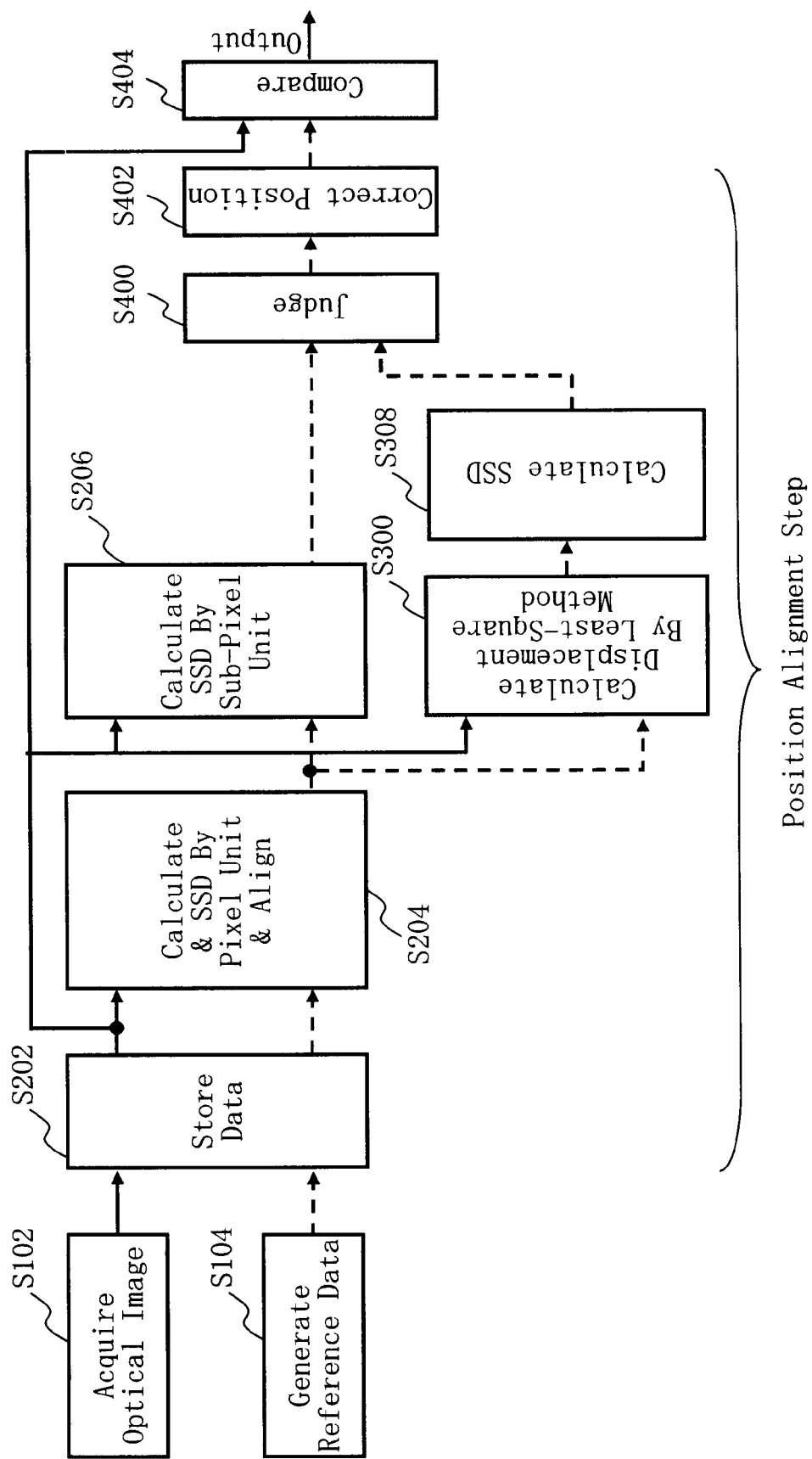
FIG. 14 is a flowchart showing main steps of pattern inspection method described in Embodiment 3.

FIG. 14 is a flowchart showing main steps of pattern inspection method described in Embodiment 3. In the figure, the target workpiece inspection method executes a series of steps including the optical image acquiring step (S102), the reference data generating step (S104), the alignment step, and the comparing step (S404). As the alignment step being one example of the image alignment method, a series of steps including the storing step (S202), a pixel unit SSD calculating step (S204), a sub-pixel unit SSD calculating step (S206), the least-squares method displacement calculating step (S300), a SSD calculating step (S308), a estimating step (S400), and the position correcting step (S402) are executed. In FIG. 14 as well as FIG. 3, solid lines show the flow of measurement data (optical image), and dotted lines show the flow of reference data.

Each of the steps from S102 to S202 is the same as that in Embodiment 1 or Embodiment 2.

In step S204, as the pixel unit SSD calculating step, the pixel unit SSD calculating circuit 310 serving as one example of an SSD calculating unit calculates a displacement amount from a first preliminary alignment position to a position where the SSD between a pixel value of the measurement data and a pixel value of the reference data becomes the minimum, by performing shifting in a pixel unit from the first preliminary alignment position. A position which should be tentatively in accordance in the data coordinate system can be used as the first preliminary alignment position, which is the same as Embodiment 1 or 2.

Figure 15:
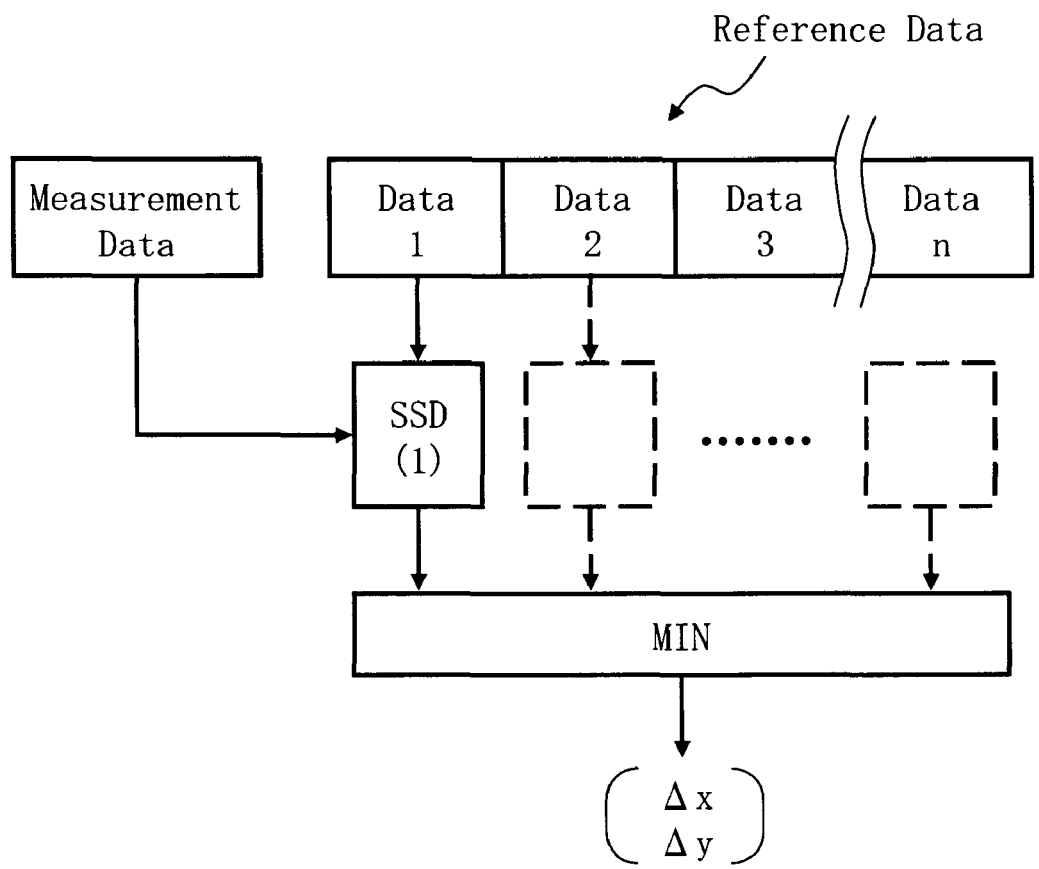
FIG. 15 is a diagram for explaining an SSD calculation method described in Embodiment 3.

FIG. 15 is a diagram for explaining an SSD calculation method described in Embodiment 3. First, the pixel unit SSD calculating circuit 310 reads reference data of an image area of a predetermined size (frame) serving as the unit of comparing process, from the reference data memory 302 on the basis of positional information from the position circuit 107. At this moment, the pixel unit SSD calculating circuit 310 respectively generates images (displaced images), shifted in parallel in units of pixels, with respect to the reference data of such a frame. In FIG. 15, the generated images are shown as data 1, data 2, . . . data n. The measurement data and the reference data in the frame are compared. For example, it is preferable to make an area of 512×512 pixels as one frame. Between each item of plural reference data displaced in units of pixels and the measurement data of the area of the same size read from the measurement data memory 304, the SSD is calculated. The SSD is obtained by summing the squared residual between each pixel value of the reference data and each pixel value of the measurement data. Then, the SSD of each of the plural reference data is calculated, and the minimum value of the SSD is calculated. The measurement data and the reference data are aligned to a position where the minimum value is obtained. In this manner, it is possible to make alignment to the position where the measurement data and the reference data are positioned closest when shifted in parallel in x and y directions in units of pixels. Such a position is made as a second preliminary alignment position, and a detailed alignment is performed hereinafter.

In step S206, as the sub-pixel image unit SSD calculating step, the sub-pixel unit SSD calculating circuit 320 serving as one example of the SSD calculating unit performs displacing in units of pixels from the second preliminary alignment position between the measurement data and the reference data, which is preliminarily aligned in the pixel unit SSD calculating step, to the position (first position) where the SSD between a pixel value of the measurement data and a pixel value of the reference data is minimized, and calculates the displacement amount (first displacement amount) from the second preliminary alignment position to the first position.

The sub-pixel unit SSD calculating method is the same as the contents explained with reference to FIG. 15. On the basis of the second preliminary alignment position, images (displaced images) shifted in parallel in units of sub-pixels are respectively generated with respect to the reference data of the size of the area to be compared. In FIG. 15, the generated images are shown as data 1, data 2, ... data n. For example, as sub-pixels, $\frac{1}{8}$, $\frac{1}{16}$, $\frac{1}{32}$ and the like of one pixel are made into units. For example, when $\frac{1}{8}$ of one pixel is made as the unit of the sub-pixel, the reference data of areas of a predetermined size displaced by $\pm\frac{1}{8}$ pixel, $\pm\frac{2}{8}$ pixel, $\pm\frac{3}{8}$ pixel, $\pm\frac{4}{8}$ pixel, $\pm\frac{5}{8}$ pixel, $\pm\frac{6}{8}$ pixel, and $\pm\frac{7}{8}$ pixel in the X direction and the Y direction, respectively, and the reference data with the displacement amount of 0 are generated. That is, 256 kinds of reference data in a combination of 16 ways in the X direction and 16 ways in the Y direction are generated. Then, the SSD is calculated between the respective reference data and the respective measurement data. The SSD is obtained by summing the squared residual between each pixel value of the reference data and each pixel value of the measurement data. Then, the SSD of each of the plural reference data is calculated, and the minimum value of the SSD is calculated. In this manner, it is possible to obtain the displacement amount to the position where the minimum value is obtained. The data such as the displacement amount which has been set and the calculated SSD are stored in the calculation data memory 330. In this way, it is possible to obtain the displacement amount $(x_0, y_0)$ for alignment of the measurement data and the reference data to the position where they are positioned closest when shifted in parallel in the X and Y directions in units of sub-pixels.

In step S300, as the least-squares method displacement calculating step, the least-squares method displacement calculating circuit 322 serving as one example of a least-squares method calculating unit calculates a displacement amount (second displacement amount) based on the least-squares method displaced from the above-mentioned second preliminary alignment position between the measurement data and the reference data. The contents of the displacement calculation based on the least-squares method is the same as those in Embodiment 1 or Embodiment 2. That is, after performing a dimension judging and making the correlation matrix be rank deficient depending upon the type of a pattern, the displacement amount etc. is obtained by a displacement amount calculation based on the least-squares method. In other words, according to the method of Embodiment 1, it is possible to obtain 4(N+4) variables, such as image transmission loss ratios $\epsilon_0$ to $\epsilon_N$, displacement amounts $x_0$, and $y_0$, and a graylevel offset $\delta$. According to the method of Embodiment 2, it is possible to obtain 4(N+4) variables, such as image transmission loss ratios $\epsilon_{0(0)}$ to $\epsilon_{N(3)}$, displacement amounts $x_{0(0)}$, $x_{0(1)}$, $x_{0(2)}$, $x_{0(3)}$, $y_{0(0)}$, $y_{0(1)}$, $y_{0(2)}$, and $y_{0(3)}$, and graylevel offsets $\delta_{(0)}$ to $\delta_{(3)}$. In the case where dividing is performed by weighting as the method of Embodiment 2, the displacement amount $(x_0, y_0)$ for alignment to the position where the measurement data and the reference data are positioned closest can be obtained by composing. In the methods of Embodiments 1 and 2, if indeterminate solutions exist, the indeterminate solutions are excluded as a matter of course.

In step S308, as the SSD calculating step, the SSD calculating circuit 324 serving as one example of the SSD calculating unit calculates the SSD between a pixel value of the measurement data and a pixel value of the reference data at the position $(x-x_0, y-y_0)$ (second position) displaced by the displacement amount $(x_0, y_0)$ calculated by the least-squares method displacement calculating circuit 322 from the above-mentioned preliminary alignment position between the measurement data and the reference data.

In step S400, as the estimating step, the estimating circuit 340 serving as an example of a estimating unit estimates which of the SSD at the first position and the SSD at the second position is smaller. That is, the estimating circuit 340 estimates which of the minimum SSD obtained as the result of the calculation by the sub-pixel unit SSD calculating circuit 320 and the SSD obtained as the result of the calculation by the SSD calculating circuit 324 is smaller.

In step S402, as the position correcting step, the position correcting circuit 350 serving as one example of the position correcting unit corrects the alignment position between the measurement data and the reference data to a position where the smaller SSD determined by the estimating circuit 340 is obtained. Further, it is also preferable that the position correcting circuit 350 corrects the image graylevel of each pixel of the reference data by use of the image transmission loss ratio E calculated by the least-squares method displacement calculating circuit 322. For example, not only when the estimating circuit 340 adopts the result calculated by the SSD calculating circuit 324, but also when the estimating circuit 340 adopts the result calculated by the sub-pixel unit SSD calculating circuit 320, the image graylevel of each pixel of the reference data is preferably corrected by use of the image transmission loss ratio $\epsilon$ calculated by the least-squares method displacement calculating circuit 322.

Herein, the type of patterns suitable for the SSD method or the least-squares method is different. For example, the SSD method is suited for aligning patterns of sparse figure density. On the other hand, the least-squares method is suited for aligning patterns of dense figure density. For this reason, with the configuration as explained in the present Embodiment, the SSD of the least-squares method is compared with the minimum SSD of the SSD in units of sub-pixels, and the correcting method with the smaller SSD between the SSD of the least-squares method and the SSD in units of sub-pixels is adopted, so that better results are expected than those in a case of correction made singly by each of the methods.

More specifically, in the case of an image of a sparse pattern, the calculation by the least-squares method may become unstable, and thus, alignment by the SSD is adopted in that case. A parallel use of the SSD method and the least-squares method makes it possible to stably correct even such a sparse pattern.

By correcting the reference data serving as a reference image or the measurement data serving as an optical image (actual image) by use of such a value, it is possible to make the measurement data and the reference data further closer to each other. As a result, it is possible to prevent a false detection in inspecting defects, and to increase the practical sensitivity. As mentioned above, by simply correcting the displacement between the reference image and the actual image and the image transmission loss, a highly sensitive inspection can be achieved.

Herein, the object to be compared in the estimating step is not limited to the SSD, but the sum of the p-th power of a residual wherein p is a positive number may be adopted generally. The SSD corresponds to the case of P=2. In other words, a position correction by the SSD is performed in parallel with the least-squares method, and the sum of the p-th power (p is a positive number) of the residual absolute value of the actual image and the corrected reference image is calculated in the respective cases of the correction by the least-squares method and the correction by the SSD method, both of the values are compared with each other, and a correction method in which the sum of the p-th power of the residual absolute value becomes minimum may be selected. Then, the result of the correcting is output to the comparing circuit 108.

In step S404, as the comparing step, the comparing circuit 108 aligns, by means of the position alignment circuit 140, the measurement data serving as a pattern image to be inspected generated by the sensor circuit 106 on the basis of the transfer image obtained from the photo mask 101, and the reference data serving as an inspection standard pattern image generated by the reference circuit 112, and then takes in both the data. Then, the comparing circuit 108 compares them, namely the taken measurement data and reference data, with each other according to a predetermined algorithm, and estimates whether there is a defect or not. The comparing circuit 108 outputs the result of the comparing. Thus, by performing a data comparison through such a highly precise alignment, it is possible to prevent a false detection of a defect and to decrease pseudo defects, thereby performing a highly precise inspection.

Embodiment 4

In Embodiment 3, the case where a sub-pixel unit SSD calculation is performed in parallel with a least-squares method displacement calculation has been explained. In Embodiment 4, the case where the sub-pixel unit SSD calculation is performed in series with the least-squares method displacement calculation will now be explained. The apparatus structure described in Embodiment 4 is the same as that in Embodiment 3. Moreover, each configuration in the least-squares method displacement calculating circuit 322 is the same as that in Embodiment 3, and the same as that of FIG. 2 or FIG. 10.

Figure 16:
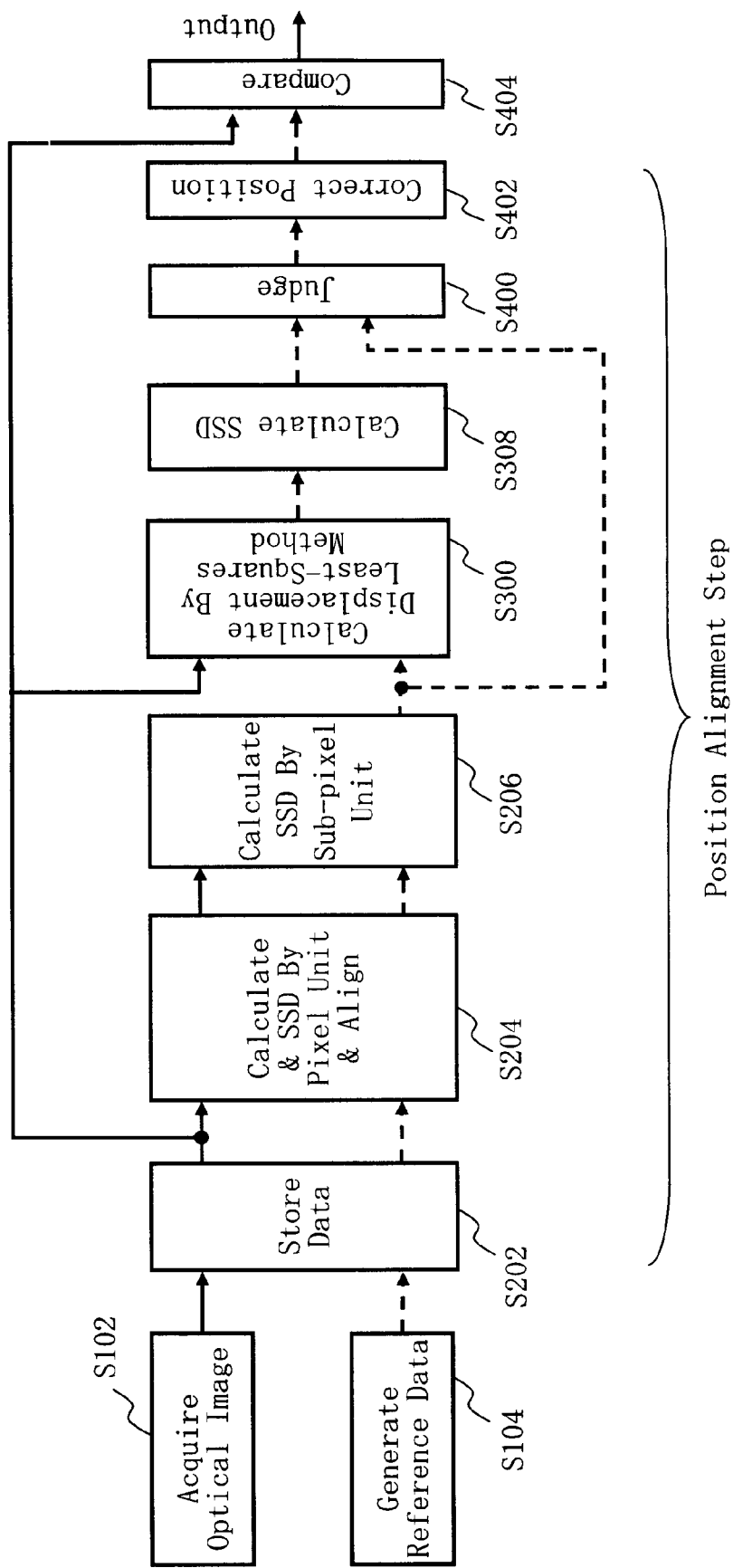
FIG. 16 is a flowchart showing main steps of pattern inspection method described in Embodiment 4.

FIG. 16 is a flowchart showing main steps of the target workpiece inspection method described in Embodiment 4.

In FIG. 14, the sub-pixel unit SSD calculating step (S206) is performed in parallel with a combination of the least-squares method displacement calculating step (S300) and the SSD calculating step (S308). In FIG. 16, after the sub-pixel unit SSD calculating step (S206), the least-squares method displacement calculating step (S300) and the SSD calculating step (S308) are performed, and others are the same as those of FIG. 14. In FIG. 16, as well as FIG. 3, solid lines show the flow of measurement data (optical image), and dotted lines show the flow of reference data.

Each of the steps from S104 to S206 in FIG. 16 is the same as that of Embodiment 3.

In step S300 in FIG. 16, as the least-squares method displacement calculating step, the least-squares method displacement calculating circuit 322 serving as one example of the least-squares method calculating unit calculates a displacement amount (second displacement amount) based on the least-squares method displaced from the first position of the measurement data and the reference data. That is, further alignment is performed for the position (first position) where the minimum SSD obtained as a result of calculating by the sub-pixel unit SSD calculating circuit 320. Thus, by performing further alignment from the position obtained by the sub-pixel unit SSD calculation, highly precise alignment can be performed. The contents of the displacement amount calculation based on the least-squares method are the same as those in Embodiment 1 or 2, that is, the same as those in Embodiment 3.

In step S308 in FIG. 16, as the SSD calculating step, the SSD calculating circuit 324 serving as one example of the SSD calculating unit calculates an SSD between the pixel value of the measurement data and the pixel value of the reference data at the position $(x-x_0, y-y_0)$ (second position) obtained by displaced by the displacement amount $(x_0, y_0)$ calculated by the least-squares method displacement calculating circuit 322 from the above-mentioned first position of the measurement data and the reference data.

In step S400 of FIG. 16, as the estimating step, the estimating circuit 340 serving as one example of the estimating unit estimates which of the SSD at the first position and the SSD at the second position is smaller. That is, the judgment circuit 340 estimates which of the minimum SSD obtained as the result of the calculation by the sub-pixel unit SSD calculating circuit 320 and the SSD obtained as the result of the calculation by the SSD calculating circuit 324 is smaller. The following is the same as Embodiment 3.

As mentioned above, by performing alignment from the position obtained by the sub-pixel unit SSD calculation, it is possible to further enhance the precision of Embodiment 3.

Figure 17:
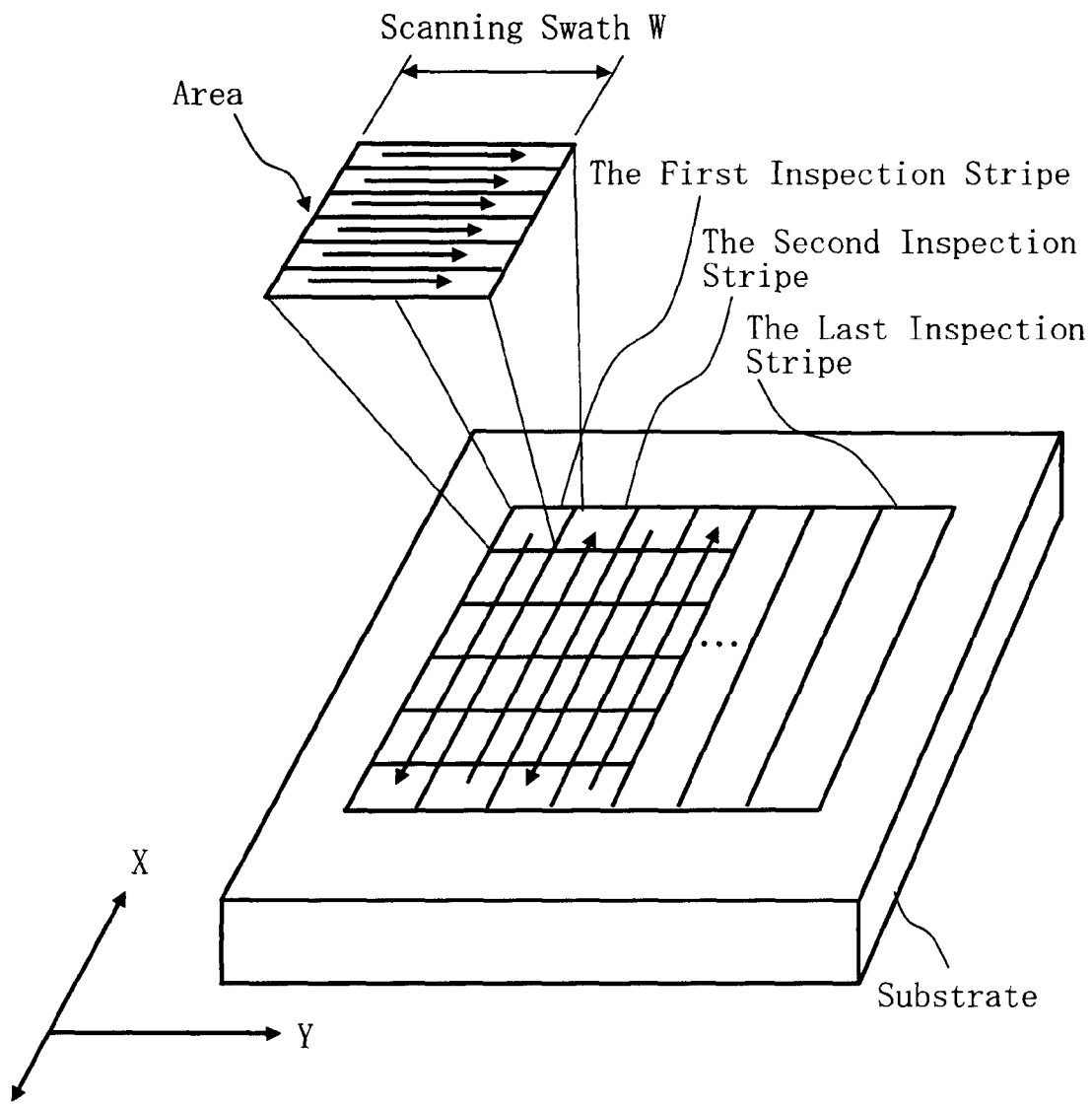
FIG. 17 is a diagram for explaining another method of acquiring an optical image.

In each of the Embodiments mentioned above, with the configuration of FIG. 1, the photodiode array 105 which simultaneously inputs beams corresponding to the number of pixels (for example, 2048 pixels) of the scanning swath W is employed, but not limited to it. FIG. 17 is a diagram for explaining another method for acquiring an optical image. As shown in FIG. 17, an alternative method may be used in which, while the XYθ table 102 is transferred at a constant speed in the X direction, a laser scanning optical device (not shown) scans with a laser beam in the Y direction at every time when movement of a predetermined pitch is detected by a laser interferometer, and transmitted light is detected to acquire a two-dimensional image in every area having a predetermined size.

As mentioned above, according to each Embodiment, it is possible to calculate a displace amount by a least-squares method after eliminating a solution which is intrinsically indeterminate. Moreover, according to one embodiment of the present invention, it is possible to correct an alignment position between an optical image and a reference image by using one of the more appropriate displacement amount in the displacement amount being the minimum SSD obtained as a result of the SSD calculation and the displacement amount obtained as a result of the least-squares method calculation. That is, it is possible to correct an alignment position by a more suitable optimization technique depending upon an image. Thus, highly precise position alignment can be performed, thereby performing a high sensitive inspection.

What is expressed by "unit", "circuit" or "step" in the above description can be configured by a computer-executable program. They may be executed by a software program or by any combination of software, hardware and/or firmware. Alternatively, they may be configured by hardware. When configured by a program, the program is recordable or storable onto a recording medium, such as a magnetic disk drive, magnetic tape drive, FD or ROM (read-only memory). For example, the table control circuit 114, the reference circuit 112, the comparing circuit 108, the position alignment circuit 140, the respective circuits in the position alignment circuit 140, and the like may be constituted by electric circuits or the like. Alternatively, they may be achieved as software processable by the control computer 110, or achieved by a combination of electric circuits and software.

As mentioned above, Embodiments have been described with reference to the concrete examples. However, the present invention is not limited to these concrete examples. For example, transmitted light is used in Embodiments, but reflected light may also be used, or transmitted light and reflected light may be used simultaneously. The reference image is generated from design data, but alternatively, data of a same pattern photo-captured by a sensor such as a photodiode array may be employed. In other words, it is equally preferable to employ the die to die inspection or the die to database inspection.

Moreover, though apparatus configurations, control methods, etc. which are not directly required in explaining the present invention are not described, a necessary apparatus configuration and a necessary control method can be appropriately selected and used.

Furthermore, all of target workpiece inspection apparatuses, target workpiece inspection methods, image alignment methods, and positional displacement estimating methods which have the elements of the present invention and which can be appropriately changed in design by a person skilled in the art are included in the spirit and scope of the invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
   an optical image acquiring unit configured to acquire an optical image of pattern to be inspected on which a pattern is formed;
   a reference image generating unit configured to generate a reference image to be compared with the optical image;
   a normal matrix element calculating unit configured to calculate a plurality of elements of a normal matrix for a least-squares method for calculating a displacement amount displaced from a preliminary alignment position between the optical image and the reference image;
   a pattern type estimating unit configured to estimate a type of a pattern indicated by the reference image, by using some of the plurality of elements of the normal matrix;
   a displacement calculating unit configured to calculate the displacement amount displaced from the preliminary alignment position based on the least-squares method, by using a normal matrix obtained by deleting predetermined elements from the plurality of elements of the normal matrix depending upon the type of the pattern which has been estimated;
   a position correcting unit configured to correct an alignment position between the optical image and the reference image to a position displaced from the preliminary alignment position by the displacement amount; and
   a comparing unit configured to compare the optical image and the reference image whose alignment position has been corrected.

2. The apparatus according to claim 1, wherein the pattern type estimating unit estimates the type of the pattern indicated by the reference image by using a trace and an absolute value of a determinant of a matrix of two rows and two columns composed of some of the plurality of elements of the normal matrix.

3. The apparatus according to claim 2, wherein as elements of the matrix of two rows and two columns, a total sum of first differentiation values obtained by space differentiating data of the reference image in X direction with respect to each pixel, a total sum of second differentiation values obtained by space differentiating data of the reference image in Y direction with respect to each pixel, a total sum of squared first differentiation values, and a total sum of squared second differentiation values are used.

4. The apparatus according to claim 3, wherein
   the pattern type estimating unit estimates the type of the pattern to be an no-structure pattern in which a whole image is a pattern when the trace is smaller than a first threshold value and the absolute value of the determinant is smaller than a second threshold value,
   to be a line and space pattern with an arbitrary angle when the trace is greater than or equal to the first threshold value and the absolute value of the determinant is smaller than the second threshold value, and to be other pattern when the trace is greater than or equal to the first threshold value and the absolute value of the determinant is greater than or equal to the second threshold value, and
   the displacement calculating unit, when the type of the pattern is estimated to be the no-structure pattern, calculates the displacement amount by using a normal matrix obtained by deleting elements using the first differentiation value of the normal matrix and elements using the second differentiation value of the normal matrix from the plurality of elements of the normal matrix, and when the type of the pattern is estimated to be the line and space pattern, calculates the displacement amount by using a normal matrix obtained by deleting elements using predetermined one of the first differentiation value and the second differentiation value of the normal matrix from the plurality of elements of the normal matrix.

5. The apparatus according to claim 1, wherein the displacement calculating unit divides the reference image by weighting and calculates the displacement amount for each of divided areas.

6. A pattern inspection apparatus comprising:
   an optical image acquiring unit configured to acquire an optical image of pattern to be inspected on which a pattern is formed;
   a reference image generating unit configured to generate a reference image to be compared with the optical image;
   a first SSD (Sum of Squared Difference) calculating unit configured to calculate a first displacement amount from a preliminary alignment position between the optical image and the reference image to a first position where an SSD between a pixel value of the optical image and a pixel value of the reference image is minimized;
   a normal matrix element calculating unit configured to calculate a plurality of elements of a normal matrix for a least-squares method for calculating a displacement amount displaced from the preliminary alignment position;
   a pattern type estimating unit configured to estimate a type of a pattern indicated by the reference image, by using some of the plurality of elements of the normal matrix;
   a displacement calculating unit configured to calculate a second displacement amount displaced from the preliminary alignment position based on the least-squares method, by using a normal matrix obtained by deleting predetermined elements from the plurality of elements of the normal matrix depending upon the type of the pattern which has been estimated;

a second SSD calculating unit configured to calculate an SSD between the pixel value of the optical image and the pixel value of the reference image at a second position displaced from the preliminary alignment position by the second displacement amount;

an SSD estimating unit configured to estimate which of the SSD at the first position and the SSD at the second position is smaller;

a position correcting unit configured to correct an alignment position between the optical image and the reference image to a position where a smaller SSD as a result estimated by the SSD estimating unit is obtained; and a comparing unit configured to compare the optical image and the reference image whose alignment position has been corrected.

7. The apparatus according to claim 6, wherein the pattern type estimating unit estimates the type of the pattern indicated by the reference image by using a trace and an absolute value of a determinant of a matrix of two rows and two columns composed of some of the plurality of elements of the normal matrix.

8. The apparatus according to claim 7, wherein as elements of the matrix of two rows and two columns, a total sum of first differentiation values obtained by space differentiating data of the reference image in X direction with respect to each pixel, a total sum of second differentiation values obtained by space differentiating data of the reference image in Y direction with respect to each pixel, a total sum of squared first differentiation values, and a total sum of squared second differentiation values are used.

9. The apparatus according to claim 8, wherein
the pattern type estimating unit estimates the type of the pattern to be an no-structure pattern in which a whole image is a pattern when the trace is smaller than a first threshold value and the absolute value of the determinant is smaller than a second threshold value,
to be a line and space pattern with an arbitrary angle when the trace is greater than or equal to the first threshold value and the absolute value of the determinant is smaller than the second threshold value, and to be other pattern when the trace is greater than or equal to the first threshold value and the absolute value of the determinant is greater than or equal to the second threshold value, and
the displacement calculating unit, when the type of the pattern is estimated to be the no-structure pattern, calculates the second displacement amount by using a normal matrix obtained by deleting elements using the first differentiation value of the normal matrix and elements using the second differentiation value of the normal matrix from the plurality of elements of the normal matrix, and when the type of the pattern is estimated to be the line and space pattern, calculates the second displacement amount by using a normal matrix obtained by deleting elements using predetermined one of the first differentiation value and the second differentiation value of the normal matrix from the plurality of elements of the normal matrix.

10. The apparatus according to claim 6, wherein the first SSD calculating unit calculates the first displacement amount by performing displacing by subpixel unit to a position where the SSD is minimized.

11. The apparatus according to claim 6, wherein the displacement calculating unit divides the reference image by weighting and calculates the displacement amount for each of divided areas.

12. A pattern inspection apparatus comprising:

an optical image acquiring unit configured to acquire an optical image of pattern to be inspected on which a pattern is formed;

a reference image generating unit configured to generate a reference image to be compared with the optical image;

a first SSD (Sum of Squared Difference) calculating unit configured to calculate a first displacement amount from a preliminary alignment position between the optical image and the reference image to a first position where an SSD between a pixel value of the optical image and a pixel value of the reference image is minimized;

a normal matrix element calculating unit configured to calculate a plurality of elements of a normal matrix for a least-squares method for calculating a displacement amount displaced from the first position;

a pattern type estimating unit configured to estimate a type of a pattern indicated by the reference image, by using some of the plurality of elements of the normal matrix;

a displacement calculating unit configured to calculate a second displacement amount displaced from the first position based on the least-squares method, by using a normal matrix obtained by deleting predetermined elements from the plurality of elements of the normal matrix depending upon the type of the pattern which has been estimated;

a second SSD calculating unit configured to calculate an SSD between the pixel value of the optical image and the pixel value of the reference image at a second position displaced from the first position by the second displacement amount;

an SSD estimating unit configured to estimate which of the SSD at the first position and the SSD at the second position is smaller;

a position correcting unit configured to correct an alignment position between the optical image and the reference image to a position where a smaller SSD as a result estimated by the SSD estimating unit is obtained; and a comparing unit configured to compare the optical image and the reference image whose alignment position has been corrected.

13. The apparatus according to claim 12, wherein the pattern type estimating unit estimates the type of the pattern indicated by the reference image by using a trace and an absolute value of a determinant of a matrix of two rows and two columns composed of some of the plurality of elements of the normal matrix.

14. The apparatus according to claim 13, wherein as elements of the matrix of two rows and two columns, a total sum of first differentiation values obtained by space differentiating data of the reference image in X direction with respect to each pixel, a total sum of second differentiation values obtained by space differentiating data of the reference image in Y direction with respect to each pixel, a total sum of squared first differentiation values, and a total sum of squared second differentiation values are used.

15. The apparatus according to claim 14, wherein
the pattern type estimating unit estimates the type of the pattern to be an no-structure pattern in which a whole image is a pattern when the trace is smaller than a first threshold value and the absolute value of the determinant is smaller than a second threshold value, to be a line and space pattern with an arbitrary angle when the trace is greater than or equal to the first threshold value and the absolute value of the determinant is smaller than the second threshold value, and to be other pattern when the trace is greater than or equal to the first threshold value and the absolute value of the determinant is greater than or equal to the second threshold value, and the displacement calculating unit, when the type of the pattern is estimated to be the no-structure pattern, calculates the second displacement amount by using a normal matrix obtained by deleting elements using the first differentiation value of the normal matrix and elements using the second differentiation value of the normal matrix from the plurality of elements of the normal matrix, and when the type of the pattern is estimated to be the line and space pattern, calculates the second displacement amount by using a normal matrix obtained by deleting elements using predetermined one of the first differentiation value and the second differentiation value of the normal matrix from the plurality of elements of the normal matrix.

16. The apparatus according to claim 12, wherein the first SSD calculating unit calculates the first displacement amount by performing displacing by subpixel unit to a position where the SSD is minimized.

17. The apparatus according to claim 12, wherein the displacement calculating unit divides the reference image by weighting and calculates the displacement amount for each of divided areas.

18. An image alignment method for aligning an optical image and a reference image for use in a comparing inspection of pattern to be inspected on which a pattern is formed, the method comprising:

calculating a first displacement amount from a preliminary alignment position between the optical image and the reference image to a first position where an SSD (Sum of Squared Difference) between a pixel value of the optical image and a pixel value of the reference image is minimized;

calculating a plurality of elements of a normal matrix for a least-squares method for calculating a displacement amount displaced from the first position;

estimating a type of a pattern indicated by the reference image, by using some of the plurality of elements of the normal matrix;

calculating a second displacement amount displaced from the first position based on the least-squares method, by using a normal matrix obtained by deleting predetermined elements from the plurality of elements of the normal matrix depending upon the type of the pattern which has been estimated;

calculating an SSD between the pixel value of the optical image and the pixel value of the reference image at a second position displaced from the first position by the second displacement amount;

estimating which of the SSD at the first position and the SSD at the second position is smaller; and correcting an alignment position between the optical image and the reference image to a position where a smaller SSD as a result of the estimating of SSD is obtained, to output a result of the correcting.

19. A computer-readable non-transitory recording medium with a program recorded for causing a computer to execute processes of:

storing an optical image and a reference image for use in a comparing inspection of pattern to be inspected on which a pattern is formed, in a storage device;

reading the optical image and the reference image from the storage device, and calculating a plurality of elements of a normal matrix for a least-squares method, based on a preliminary alignment position between the optical image and the reference image;

estimating a type of a pattern indicated by the reference image, by using some of the plurality of elements of the normal matrix; and calculating a displacement amount displaced from the preliminary alignment position based on the least-squares method, by using a normal matrix obtained by deleting predetermined elements from the plurality of elements of the normal matrix depending upon the type of the pattern which has been estimated, to output the displacement amount calculated.

\* \* \* \* \*